US008284027B2

(12) United States Patent
Taki et al.

(10) Patent No.: US 8,284,027 B2
(45) Date of Patent: Oct. 9, 2012

(54) POSITION DETECTING SYSTEM, RESPONDER AND INTERROGATOR, WIRELESS COMMUNICATION SYSTEM, POSITION DETECTING METHOD, POSITION DETECTING PROGRAM, AND INFORMATION RECORDING MEDIUM

(75) Inventors: Kazunari Taki, Nagoya (JP); Tsuyoshi Ohashi, Hashima (JP); Takuya Nagai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1787 days.

(21) Appl. No.: 11/532,649

(22) Filed: Sep. 18, 2006

(65) Prior Publication Data

US 2007/0018792 A1 Jan. 25, 2007

Related U.S. Application Data

(63) Continuation-in-part of application No. PCT/JP2005/003786, filed on Mar. 4, 2005.

(30) Foreign Application Priority Data

Mar. 17, 2004 (JP) .................. 2004-076548
Mar. 29, 2004 (JP) .................. 2004-096252

(51) Int. Cl.
*H04Q 5/22* (2006.01)
(52) U.S. Cl. .................................... 340/10.1
(58) Field of Classification Search ............. 340/10.1, 340/572.1, 505; 342/51, 50
See application file for complete search history.

(56) References Cited

U.S. PATENT DOCUMENTS

| 3,969,725 | A | * | 7/1976 | Couvillon et al. ............ 342/47 |
| 4,069,472 | A | | 1/1978 | Kamata et al. |
| 5,345,471 | A | | 9/1994 | McEwan |
| 5,361,070 | A | | 11/1994 | McEwan |
| 5,457,394 | A | | 10/1995 | McEwan |
| 5,510,800 | A | | 4/1996 | McEwan |

(Continued)

FOREIGN PATENT DOCUMENTS

DE 19957557 A1 6/2001

(Continued)

OTHER PUBLICATIONS

European Patent Office, Supplementary European Search Report for EP Appl'n No. 05720058 (counterpart to above-captioned U.S. patent appl'n), mailed Nov. 28, 2007.

(Continued)

*Primary Examiner* — Vernal Brown
(74) *Attorney, Agent, or Firm* — Baker Botts L.L.P.

(57) ABSTRACT

There is provided a radio communication system capable of distinguishing objects from one another while taking advantage of the low power consumption and distance measurement ability of the radio communication of the UWB method. A radio tag TGn includes: a characteristic impedance unit (3) for generating a response signal by using a pulse signal received from a broad-band antenna (1); a transmission path (2) having a predetermined length, transmitting the pulse signal received by the broad-band antenna (1) from the broad-band antenna (1) to the characteristic impedance unit (3), and transmitting the generated response signal from the characteristic impedance unit (3) to the broad-band antenna (1); and the broad-band antenna (1) for receiving the pulse signal and transmitting the response signal. The aforementioned pulse wave is transmitted to the radio tag TGn by the UWB method. The response signal from the radio tag TGn is received and the radio tag TGn is identified from the reception waveform.

35 Claims, 19 Drawing Sheets

U.S. PATENT DOCUMENTS

| | | | |
|---|---|---|---|
| 5,512,834 A | 4/1996 | McEwan | |
| 5,517,198 A | 5/1996 | McEwan | |
| 5,519,400 A | 5/1996 | McEwan | |
| 5,523,760 A | 6/1996 | McEwan | |
| 5,576,627 A | 11/1996 | McEwan | |
| 5,589,838 A | 12/1996 | McEwan | |
| 5,649,296 A * | 7/1997 | MacLellan et al. | 455/39 |
| 5,661,490 A | 8/1997 | McEwan | |
| 5,677,927 A | 10/1997 | Fullerton et al. | |
| 5,687,169 A | 11/1997 | Fullerton | |
| 5,691,698 A | 11/1997 | Scholl et al. | |
| 5,757,320 A | 5/1998 | McEwan | |
| 5,767,953 A | 6/1998 | McEwan | |
| 5,774,091 A | 6/1998 | McEwan | |
| 5,805,110 A | 9/1998 | McEwan | |
| 5,832,035 A | 11/1998 | Fullerton | |
| 5,933,079 A | 8/1999 | Frink | |
| 5,952,922 A * | 9/1999 | Shober | 340/572.4 |
| 5,960,031 A | 9/1999 | Fullerton et al. | |
| 5,963,581 A | 10/1999 | Fullerton et al. | |
| 5,995,534 A | 11/1999 | Fullerton et al. | |
| 6,031,862 A | 2/2000 | Fullerton et al. | |
| 6,114,971 A | 9/2000 | Nysen | |
| 6,177,872 B1 * | 1/2001 | Kodukula et al. | 340/572.7 |
| 6,430,208 B1 | 8/2002 | Fullerton et al. | |
| 6,501,807 B1 * | 12/2002 | Chieu et al. | 375/329 |
| 6,549,567 B1 | 4/2003 | Fullerton | |
| 6,657,580 B1 | 12/2003 | Edwards et al. | |
| 6,668,008 B1 | 12/2003 | Panasik | |
| 6,717,516 B2 * | 4/2004 | Bridgelall | 340/572.1 |
| 6,894,614 B2 * | 5/2005 | Eckstein et al. | 340/572.1 |
| 7,042,388 B2 * | 5/2006 | Mohamadi | 342/51 |
| 2003/0043931 A1 | 3/2003 | Fullerton et al. | |
| 2003/0058963 A1 | 3/2003 | Cattaneo et al. | |
| 2003/0069025 A1 | 4/2003 | Hoctor et al. | |
| 2003/0189975 A1 | 10/2003 | Fullerton | |
| 2003/0231107 A1 | 12/2003 | Edmonson et al. | |
| 2004/0002347 A1 | 1/2004 | Hoctor et al. | |
| 2005/0052279 A1 * | 3/2005 | Bridgelall | 340/10.1 |

FOREIGN PATENT DOCUMENTS

| | | |
|---|---|---|
| EP | 494114 A2 | 1/1992 |
| EP | 1296280 A1 | 3/2003 |
| JP | 1996096186 | 4/1996 |
| JP | H8511341 | 11/1996 |
| JP | H10508725 | 8/1998 |
| JP | 200243849 | 2/2002 |
| JP | 2002236166 | 8/2002 |
| JP | 2003124844 | 4/2003 |
| JP | 2003189353 | 7/2003 |
| JP | 2004024551 | 1/2004 |
| WO | 0106401 A1 | 1/2001 |
| WO | 0203091 A2 | 1/2002 |
| WO | 0203560 | 1/2002 |
| WO | 03098528 A2 | 11/2003 |
| WO | 2005088850 | 9/2005 |

OTHER PUBLICATIONS

European Patent Office, Supplementary Partial European Search Report for EP Appl'n No. 05720058 counterpart to above-captioned patent appl'n) mailed Jun. 20, 2007.

* cited by examiner

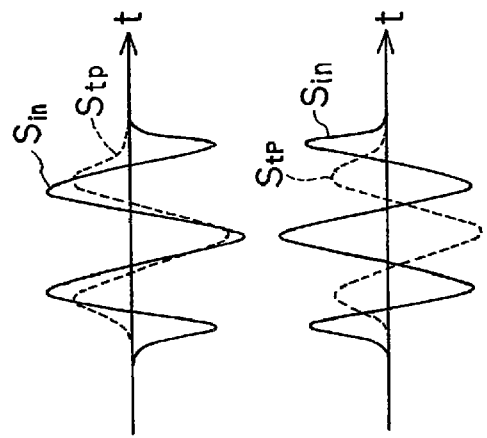
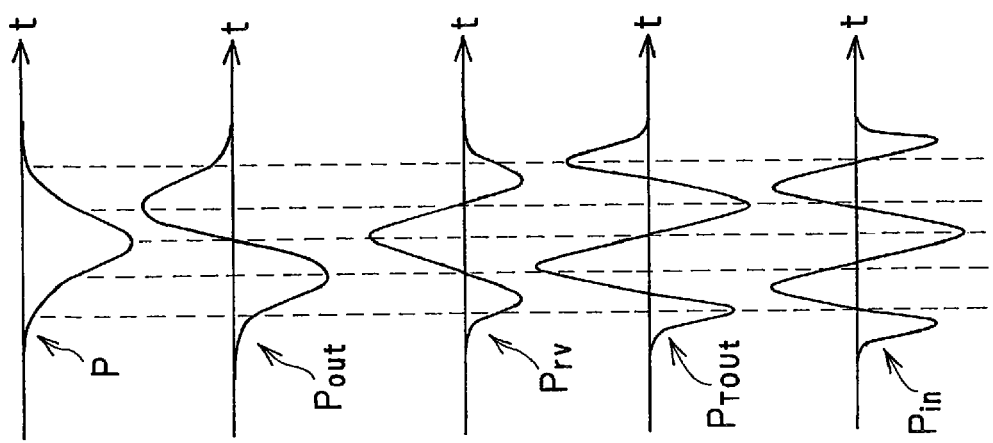

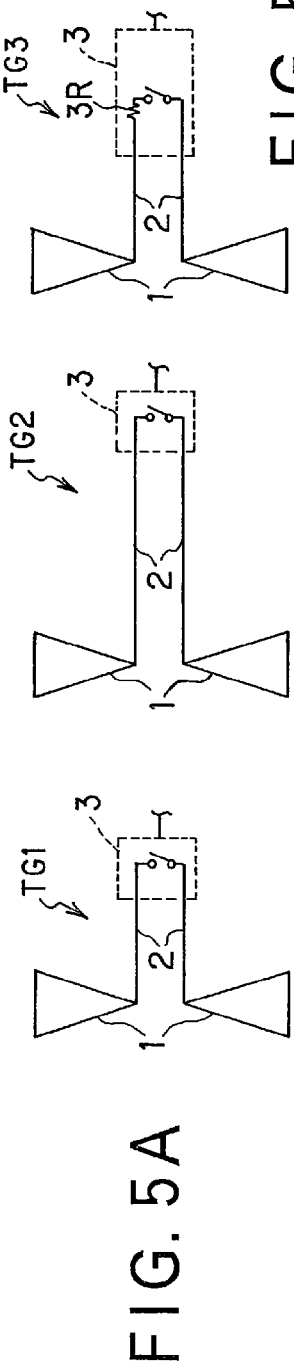
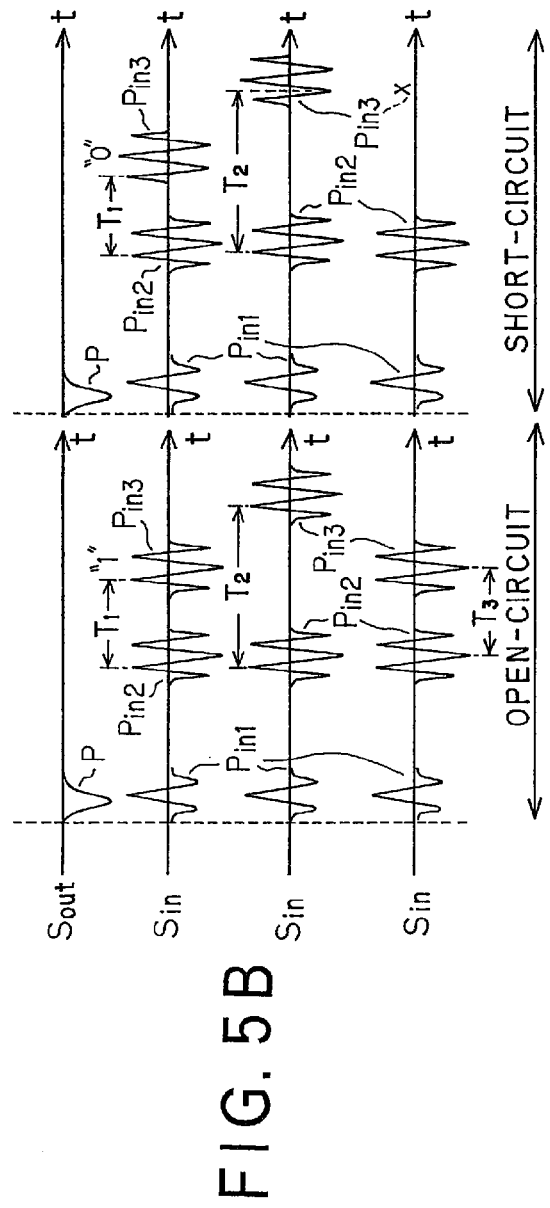
FIG. 5A FIG. 5B FIG. 5C FIG. 5D

TGGn

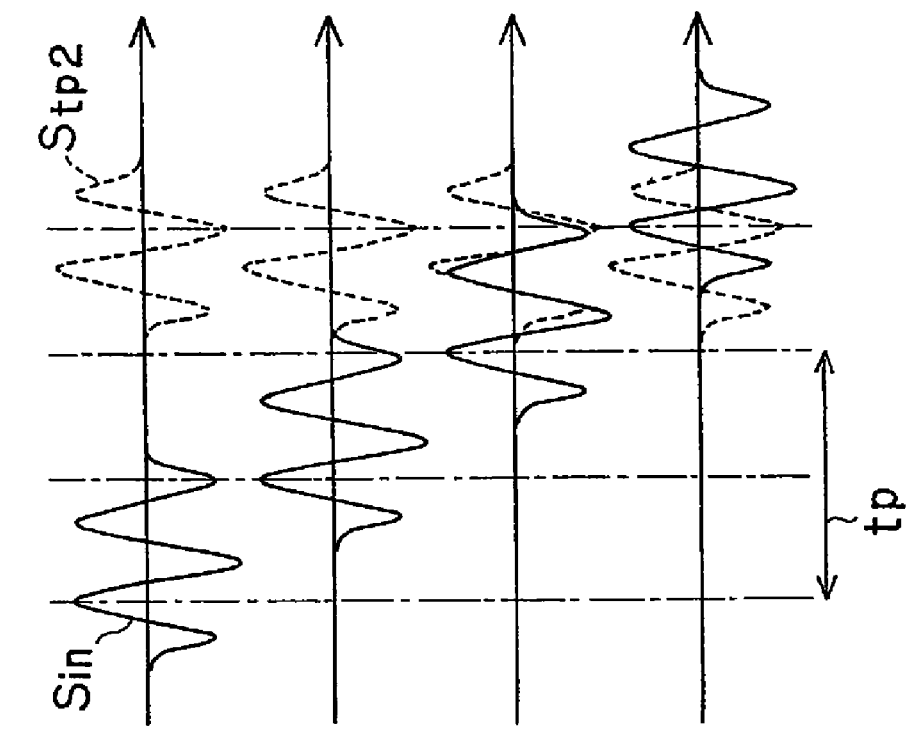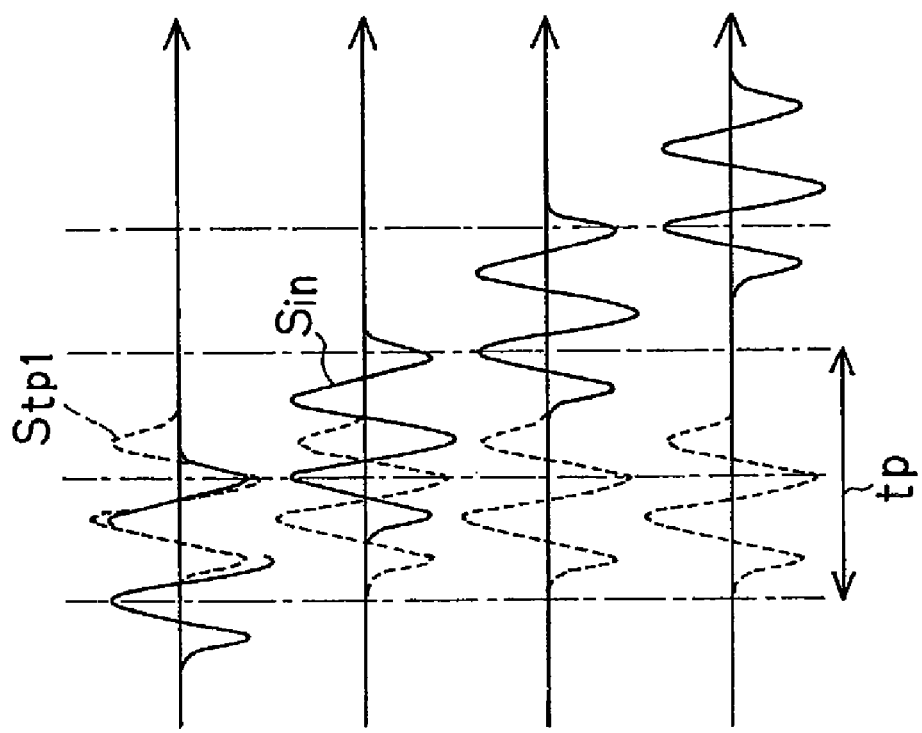

POSITION DETECTING SYSTEM, RESPONDER AND INTERROGATOR, WIRELESS COMMUNICATION SYSTEM, POSITION DETECTING METHOD, POSITION DETECTING PROGRAM, AND INFORMATION RECORDING MEDIUM

This application is a continuation-in-part of PCT/JP2005/003786, filed on Mar. 4, 2005, which claims priority to Japanese Patent Application No. 2004-076548, filed on Mar. 17, 2004, and Japanese Patent Application No. 2004-096252, filed on Mar. 29, 2004, each of which is incorporated herein by reference.

BACKGROUND OF THE INVENTION

1. Field of the Invention

The present invention relates to a position detecting system, a responder and an interrogator, a wireless communication system, a position detecting method, a position detecting program, and an information recording medium. More particularly, the present invention relates to a position detecting system that includes a responder (a wireless tag) and an interrogator that exchange information with each other through wireless communication to detect the position of each other, a position detecting method to be utilized in the position detecting system, a wireless communication system that includes the position detecting system, a position detecting program for use in the position detecting system, and an information recording medium on which the position detecting program is recorded.

2. Discussion of the Related Art

In recent years, so-called wireless tags that are formed with IC chips of 1 mm square or smaller, including wireless transmission/reception antennas and memories and the like, have been gradually put into practical use. More specifically, wireless tags are attached to commercial products to be distributed in the general market, and are distributed together with the commercial products or the like. Identification information for identifying each commercial product is stored in the memory of each corresponding wireless tag. When an interrogating signal is received from an independent interrogator via the antenna, a response signal containing the identifying information is generated in response to the interrogating signal, and is transmitted to the interrogator via the antenna. In this manner, the commercial products or the likes can be identified. Using such wireless tags, consumers can check the distribution channels of food articles from the place of production at the time of purchasing the food articles, and can also check an usage of additives and agricultural chemicals were used during the production of the food articles.

Meanwhile, the UWB (Ultra Wide Band) method for performing wireless communication using pulse waves of very short durations (1 nanosecond or less), instead of carrier waves, has also been gradually put into practical use. By this wireless communication method, pulse waves of very short durations are used, as described above, so that ultra-wideband wireless communication using band widths of several GHz or more can be performed. Also, since carrier waves are not used, the transmission output is approximately 10 nanowatt/MHz, which is very low. The UWB method which has such a configuration has the following characteristics and advantages, and is expected to be utilized in in-room communication, security sensor, high-speed wireless LAN (Local Area Network), or the like.

1) Since the power spectral density is very low in such a system according to the UWB method, there is little mutual interference with existing communication systems, and the system has high capability of coexisting with them.

2) The mean power level is 1 milliwatt or lower, and transmission can be performed in several miles or longer;

3) As pulse waves of very short durations (nanoseconds) are used, a system according to the UWB method can cope with so-called multipath propagation, having high path dividing capability, and it can perform high-precision distance measurement (in several centimeters) as a radar.

4) Since carrier waves are not necessary and the emission time for pulse waves is very short, a small-sized communication system with lower power consumption can be produced.

5) Since it always occupies a GHz wide band, high-speed (<several hundreds of Mbits/second) transmission of large-capacity and multiple access type can be performed.

6) As communication and distance measurement can be performed at the same time, it can be applied to vehicle-to-vehicle communication, for example.

Examples of general configurations to which the UWB wireless communication is applied are disclosed in Japanese Patent Application National Publication No. 10-508725; Japanese Unexamined Patent Publication Nos. JP-A-2003-189353, JP-A-2003-124844; and JP-A-2002-43849, which are hereby incorporated by reference.

A technique of detecting the distance to a moving body through wireless communication is disclosed in Japanese Patent No. 3395403, FIGS. 1 and 2 which is hereby incorporated by reference.

In a identification system containing the above-described conventional wireless tags, however, the distance from a wireless tag to an interrogator cannot be measured with adequate precision, though commercial products with the wireless tags can be distinguished from the other commercial products. The position of a wireless tag in the same room cannot be accurately detected either.

Meanwhile, with a radar using the UWB wireless communication, the distance to an object to be measured can be accurately detected, but the object to be measured cannot be distinguished from other objects.

By the technique disclosed in Japanese Patent No. 3395403, carrier waves are used to detect the distance to a moving body. Therefore, a small-sized system with low power consumption like a wireless communication system of the UWB method cannot be obtained.

SUMMARY OF THE INVENTION

With the above problems being taken into consideration, an object of the present invention is to take advantage of the characteristics of the UWB wireless communication described in the above items (1) to (6) to achieve low power consumption and accurate distance measurement, and to provide a position detecting system that includes a responder and an interrogator that can specify the distance between each two objects and can also specify the position of each object, a position detecting method to be utilized in the position detecting system, a wireless communication system that includes the position detecting system, a position detecting program for use in the position detecting system, and an information recording medium on which the position detecting program is recorded.

To achieve the above object, the present invention provides a responder that includes: a generating means that generates a response signal, using a pulse signal that is received through a wideband antenna; a transmitting means that transmits the pulse signal received through the wideband antenna from the wideband antenna to the generating means and also transmits the generated response signal from the generating means to the wideband antenna, the transmitting means having a predetermined length; and the wideband antenna that receives the pulse signal and transmits the response signal.

BRIEF DESCRIPTION OF THE DRAWINGS

FIGS. 4A and 4B show signal receiving manners in each interrogator in accordance with the first embodiment, where FIG. 4A shows the waveforms of received pulse waves; FIG. 4B illustrates the correlations between response signals and a template signal at the time of determining the content of each response signal;

FIGS. 5A to 5D illustrate the mechanism of distinguishing of wireless tags from one another in the wireless communication system in accordance with the first embodiment, where FIG. 5A illustrates exemplary structures of wireless tags contained in the wireless communication system; FIG. 5B shows waveforms illustrating the distinguishing of the wireless tags from one another; FIG. 5C illustrates another exemplary structure of a wireless tag contained in the wireless communication system; and FIG. 5D illustrates yet another exemplary structure of a wireless tag contained in the wireless communication system;

FIGS. 10A and 10B illustrate the mechanism of identification of wireless tags in the wireless communication system in accordance with the second embodiment, where FIG. 10A is a waveform chart; and FIG. 10B is another waveform chart;

FIGS. 11A, 11B and 11D are circuit diagrams schematically showing the structure of the wireless tag in accordance with the first modification; and FIG. 11C illustrates a signal receiving manner in an interrogator in accordance with the first modification;

FIG. 13A illustrates the structure of a wireless tag in accordance with the second modification; and FIG. 13B is a block diagram schematically showing the structure of an interrogator in accordance with the second modification;

FIG. 20A is a schematic diagram of the first stage of the position detecting process; FIG. 20B is a schematic diagram of the second stage of the position detecting process; and FIG. 20C is a schematic diagram of the third stage of the position detecting process.

DETAILED DESCRIPTION OF THE PREFERRED EMBODIMENTS

Preferred embodiments of the present invention will be described with reference to the accompanying drawings. The following embodiments of the present invention concern wireless communication systems in which wireless tags are distinguished from one another and interrogators are distinguished from one another by UWB wireless communication. In each of the wireless communication systems of the following embodiments, the distance between each wireless tag and each interrogator, and the distance between each two interrogators are detected so as to specify the position of each of the wireless tags and interrogators.

(1) First Embodiment

Referring to FIGS. 1 to 8, a first embodiment of the present invention will be described.

Figure 1:
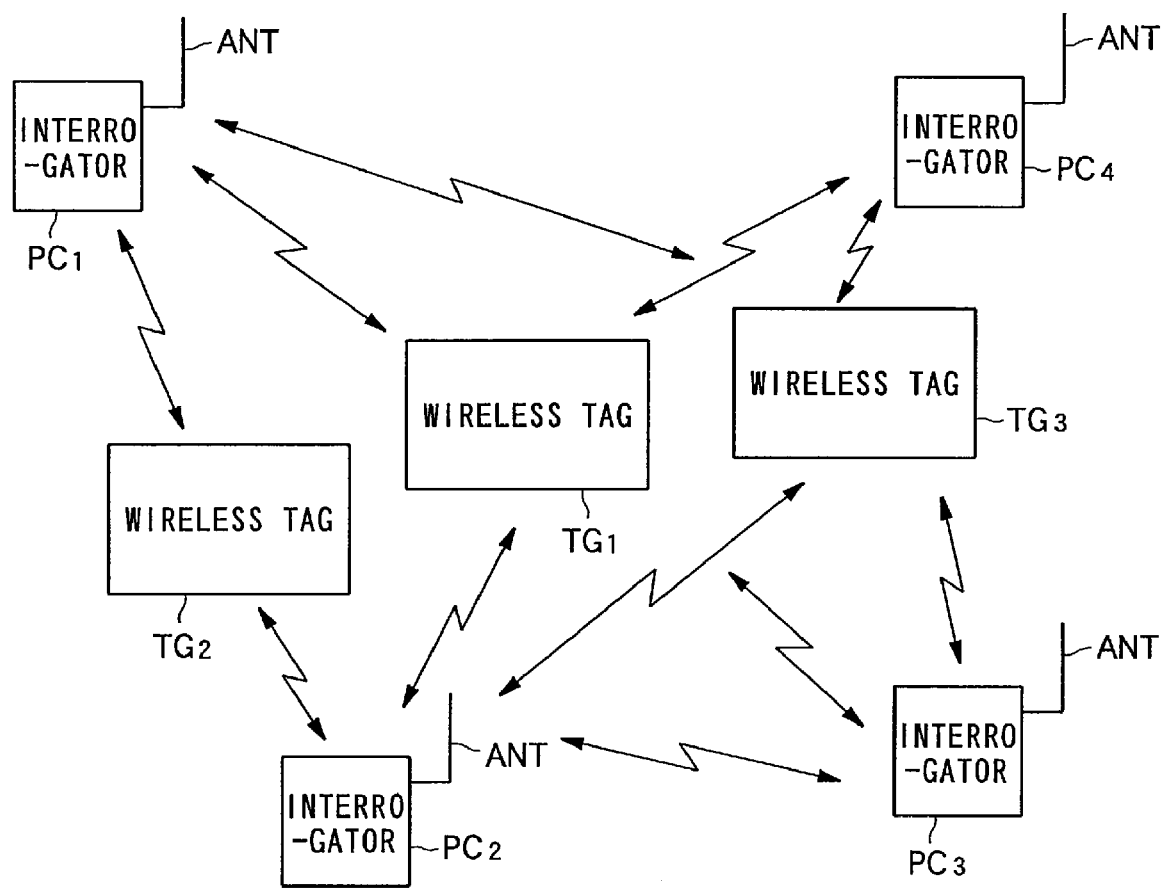
FIG. 1 is a block diagram schematically showing the structure of a wireless communication system in accordance with a first embodiment of the present invention.
Figure 2:
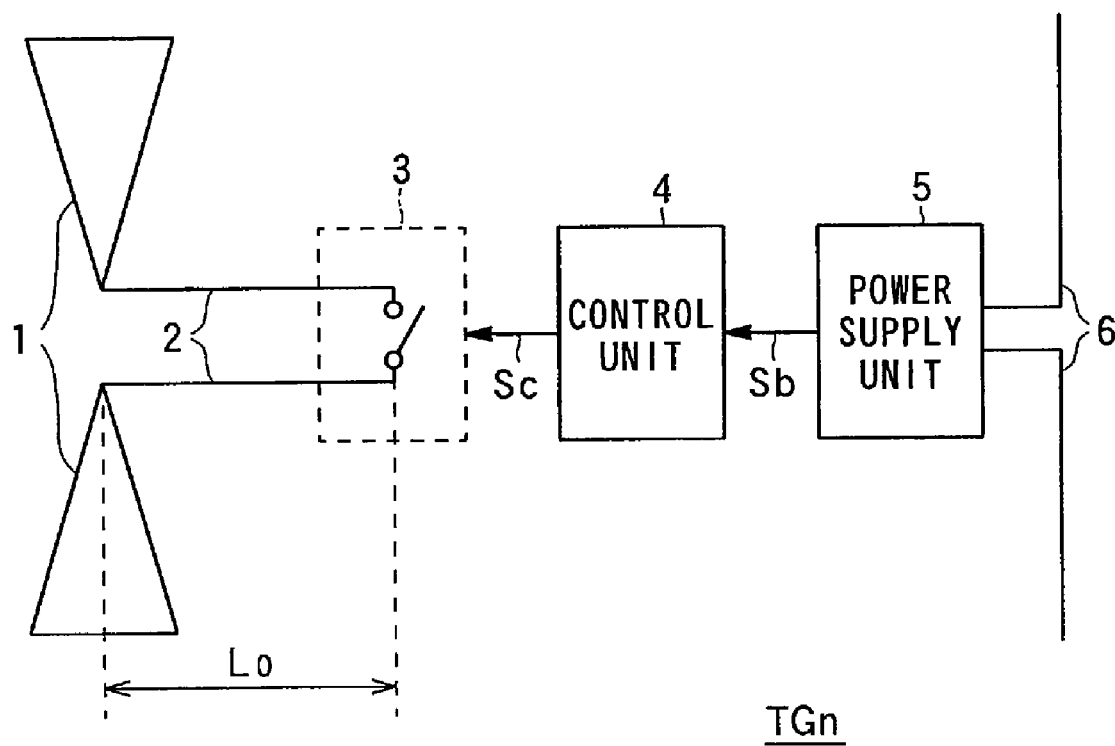
FIG. 2 is a block diagram showing the structure of a wireless tag in accordance with the first embodiment.
Figure 3:
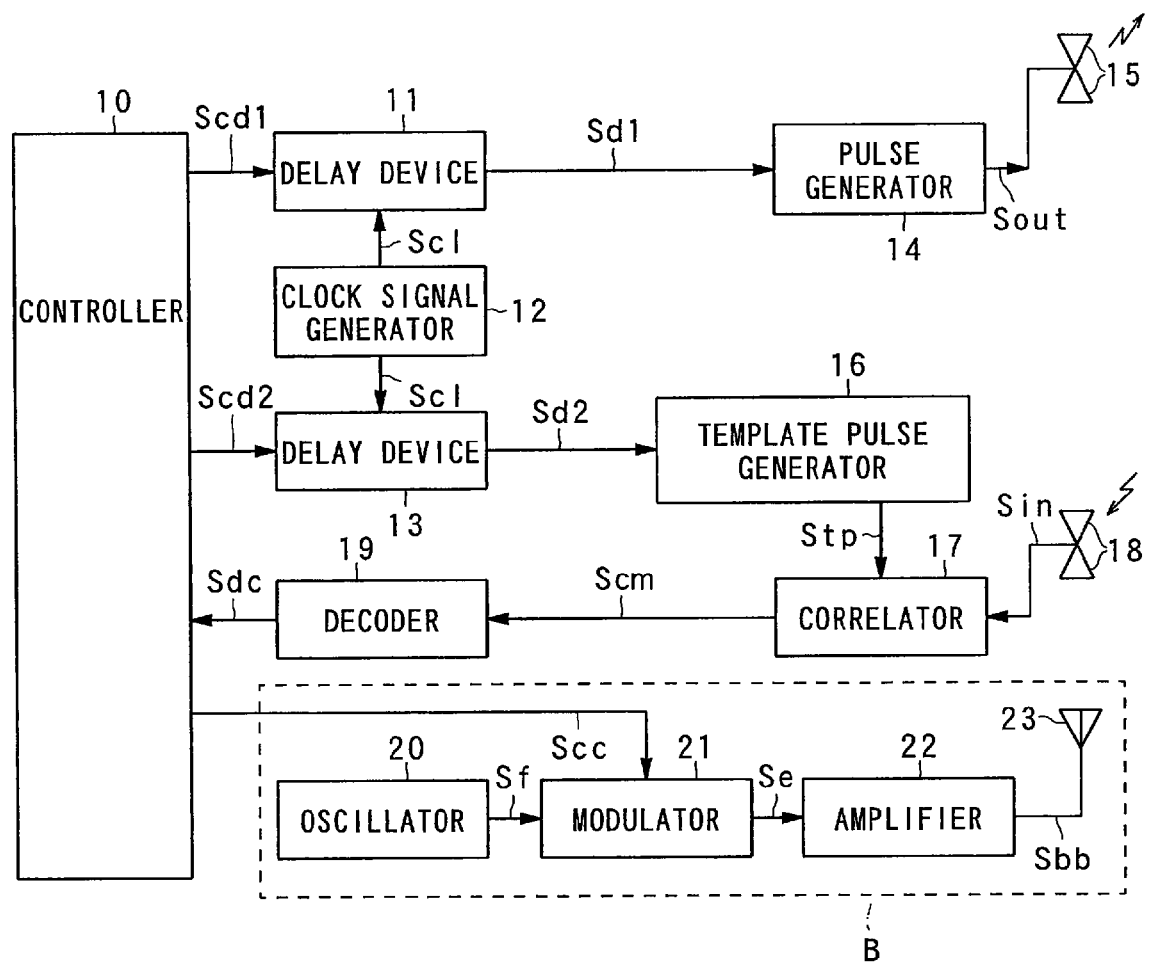
FIG. 3 is a block diagram schematically showing an interrogator in accordance with the first embodiment.
Figure 6:
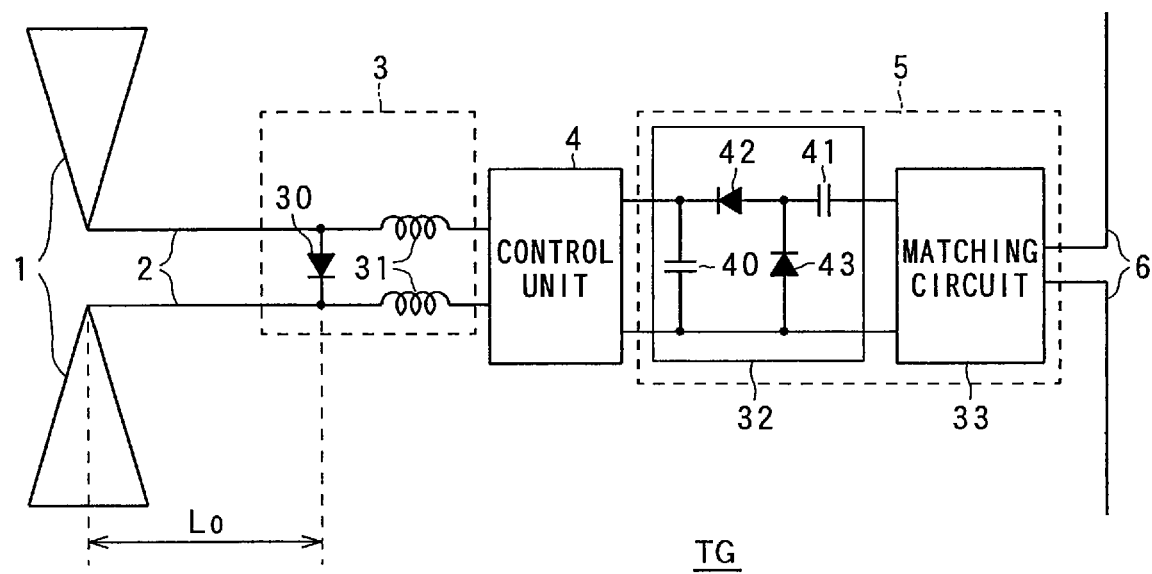
FIG. 6 is a circuit diagram illustrating in detail the structure of a wireless tag in accordance with the first embodiment.
Figure 7:
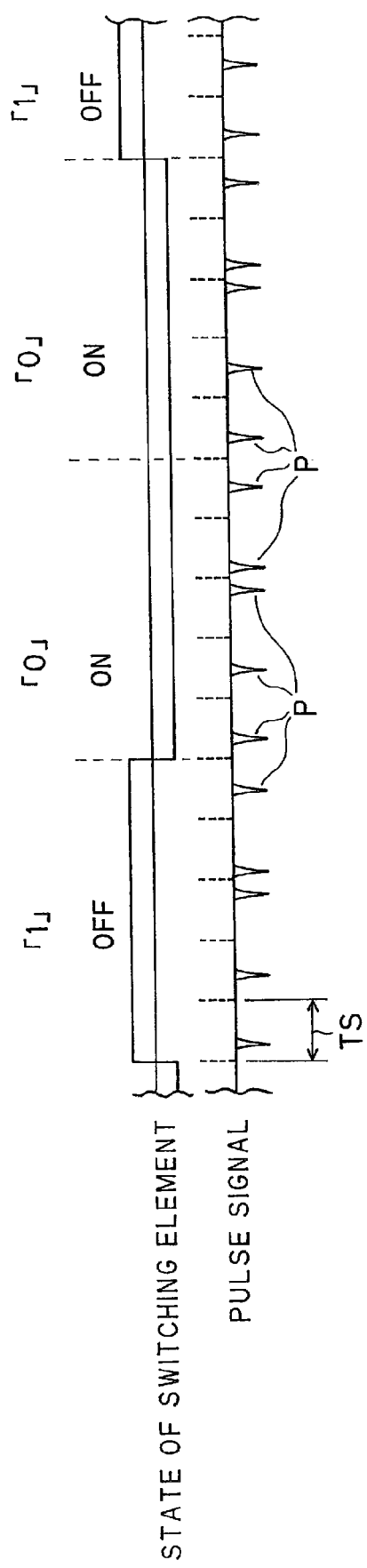
FIG. 7 shows examples of transmission waveforms in the wireless communication system in accordance with the first embodiment.
Figure 8:
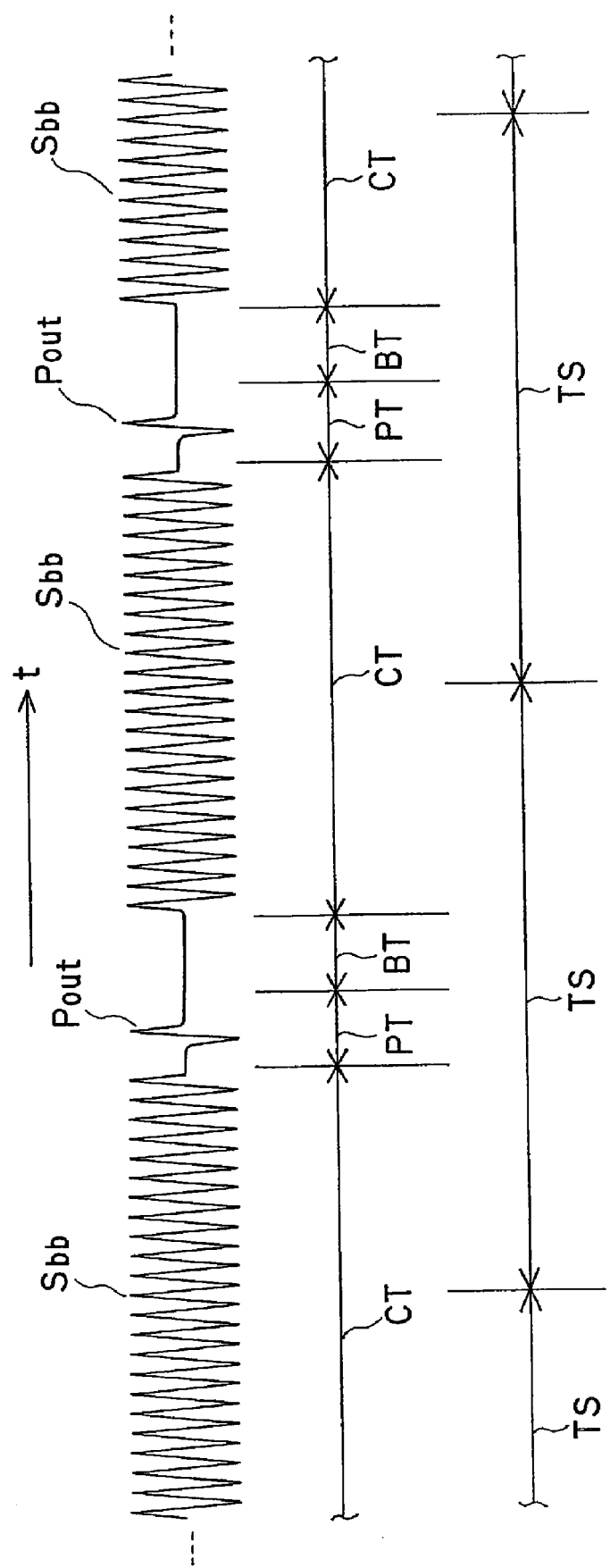
FIG. 8 is a waveform chart illustrating the power supply in accordance with the first embodiment.

FIG. 1 is a block diagram schematically showing the structure of a wireless communication system in accordance with the first embodiment. FIG. 2 is a block diagram schematically showing the structure of a wireless tag in accordance with the first embodiment. FIG. 3 is a block diagram schematically showing the structure of an interrogator in accordance with the first embodiment. FIGS. 4A and 4B are waveform charts illustrating the operations of a responder and an interrogator in accordance with the first embodiment. FIGS. 5A to 5D illustrate the operations of the interrogator and the responder in greater detail in accordance with the first embodiment. FIG. 6 is a circuit diagram showing the structure of the wireless tag in detail in accordance with the first embodiment. FIG. 7 shows an exemplary waveform of a pulse signal to be transmitted from the interrogator in accordance with the first embodiment. FIG. 8 shows exemplary waveforms of a pulse signal and an electric signal to be transmitted from the interrogator in accordance with the first embodiment.

Referring first to FIG. 1, the entire structure of the wireless communication system in accordance with the first embodiment will be schematically described.

As shown in FIG. 1, the wireless communication system S in accordance with the first embodiment includes interrogators PC1, PC2, PC3, . . . , PCn each having an antenna ANT, and wireless tags TG1, TG2, TG3, . . . , TGn as responders that are attached to commercial products to be subjected to distance measurement.

In this structure, a pulse signal in compliance with the UWB method is transmitted from each interrogator PCn to each wireless tag TGn. The pulse signal is transmitted from wideband antennas (described later) attached to each interrogator PCn, and is received by wideband antennas (described later) attached to each wireless tag TGn.

The pulse signal received by each wireless tag TGn is reflected by a load impedance unit (described later) provided in each wireless tag TGn, and is then transmitted (returned) to each interrogator PCn as a response signal (a response signal corresponding to the received pulse signal) from the wideband antennas attached to the wireless tag TGn in compliance with the UWB method.

Each interrogator PCn then receives the response signal through the wideband antennas, and detects the content of the response signal. In accordance with the detected content of the response signal, each interrogator PCn identifies each wireless tag TGn. Each interrogator PCn also detects the distance from each wireless tag TGn, based on a state of the pulse wave contained in the received response signal.

Here, the load impedance of the load impedance unit is controlled by a control unit (described later) in one wireless tag TGn such that the wireless tags TGn have different load impedances from one another. As the load impedance varies among the wireless tags TGn, the polarity or the like of the pulse wave contained in the response signal also vary among the wireless tags TGn. As a result, each interrogator PCn can identify each wireless tag TGn itself.

Referring now to FIG. 2, the structure of each wireless tag TGn will be described.

As shown in FIG. 2, each wireless tag TGn in accordance with the first embodiment includes a pair of wideband antennas 1 made of a thin-film metal or the like, a transmission line 2 as a transmitting means formed with parallel lines, a load impedance unit 3 as a generating means formed with a switching element or the like as shown in FIG. 2, a control unit 4, a power supply unit 5, and a pair of narrow-band antennas for obtaining electric power.

Next, the operation of each wireless tag TGn will be described.

First, the narrow-band antenna 6 receives an electric signal that is a continuous wave transmitted from a narrow-band antenna (described later) provided in each interrogator PCn, and outputs a current induced by the electric signal to the power supply unit 5 as a reception current.

The power supply unit 5 is then driven by the reception current, and generates a control signal Sc for controlling the load impedance formed with the load impedance unit 3 and the transmission path 2. The control signal Sc is output to the load impedance unit 3.

Meanwhile, the pair of wideband antennas 1 are wideband antennas that can perform wireless communication in compliance with the UWB method, and are electrically connected to the load impedance unit 3 via the transmission path 2.

The transmission path 2 is formed with parallel lines having constant characteristic impedance, and connects the pair of wideband antennas 1 and the load impedance unit 3.

When a pulse signal transmitted from each interrogator PCn is received by the wideband antennas 1, a reception current is induced in each of the wideband antennas 1, and the pulse signal is reflected directly from the wideband antennas 1 due to part of the reception current. The reflected pulse wave (hereinafter referred to simply as the reflected wave) is returned to the interrogator PCn.

Meanwhile, the other part of the reception current not used in the direct reflection in the wideband antennas 1 is propagated through the transmission path 2, and is reflected by the load impedance unit 3. The other part of the reception current is propagated as the response signal back to the wideband antennas 1. The response signal having reached the wideband antennas 1 is then reflected from the wideband antennas 1 and is transmitted to the interrogator PCn. Here, unnecessary reflection does not occur in the transmission path 2, since the transmission path 2 has the constant characteristic impedance.

Here, the length $L_0$ of each one transmission path 2 is set greater than the length expressed as:

$$L_0 = \text{(propagation velocity of response signal)} \times \text{(pulse width of received pulse signal)}/2,$$

and varies among the wireless tags TGn such that the reflected wave and the pulse wave forming the response signal do not overlap with each other at the time of reception in the interrogator PCn, and that the distance between the interrogator PCn and the wireless tag TGn can be detected with high accuracy using the reflected wave. Here, the propagation speed of the response signal is the propagation speed at which a pulse is propagated through the transmission path 2.

Referring now to FIG. 3, the structure of each interrogator PCn will be described in detail.

As shown in FIG. 3, each interrogator PCn in accordance with the first embodiment includes: a controller 10 that serves as an identifying means, a reflected wave detecting means, a response wave detecting means, a response wave interval detecting means, a transmission/reception interval detecting unit, and a distance recognizing means; delay devices 11 and 13; a clock signal generator 12; a pulse generator 14 as a pulse generating means; a wideband antenna 15 (for pulse signal transmission) that has the same structure as each of the wideband antennas 1 of each wireless tag TGn; a template pulse generator 16; a correlator 17; a wideband antenna 18 (for receiving a response signal from each wireless tag TGn) that has the same structure as the wideband antenna 15; a decoder 19; an oscillator 20; a modulator 21; an amplifier 22; and a narrow-band antenna 23 that has the same structure as each of the narrow-band antennas 6 of each wireless tag TGn. In this structure, the oscillator 20, the modulator 21, the amplifier 22, and the narrow-band antenna 23 form a power supply unit B that transmits an electric wave formed with a continuous wave to the narrow-band antennas 6 of each wireless tag TGn.

Next, the operation of each interrogator PCn will be described.

First, when the pulse signal is transmitted to a wireless tag TGn, the clock signal generator 12 generates a clock signal Sc1 of a predetermined constant frequency, and outputs the clock signal Sc1 to each of the delay devices 11 and 13.

The delay device 11 delays the clock signal Sc1, based on a control signal Scd1 from the controller 10. The delay device 11 then outputs a delayed clock signal Sd1 to the pulse generator 14. Here, the delay amount of the clock signal Sc1 delayed by the delay device 11 is a random amount that is determined for each pulse signal with a so-called pseudo random code, for example. The pseudo random code may be of so-called M (Maximal-length) sequences or Gold sequences, for example.

Based on the delayed clock signal Sd1, the pulse generator 14 generates a pulse signal Sout through a predetermined pulse generating process in compliance with the UWB method, and transmits the pulse signal Sout to the wireless tag TGn via the wideband antenna 15.

Meanwhile, the response signal from each wireless tag TGn is received by the wideband antenna 18, and is output as a response signal Sin to the correlator 17.

Here, the clock signal generator 12 outputs the clock signal Sc1 to the delay device 13. The delay device 13 delays the clock signal Sc1 based on a control signal Scd2 from the controller 10 and outputs the clock signal Sc1 as a delayed clock signal Sd2 to the template pulse generator 16. The delay amount in the delay device 11 and the delay amount in the delay device 13 are different from each other.

Using the delayed clock signal Sd2, the template pulse generator 16 generates a template signal Stp (described later) for analyzing the content of the received response signal Sin, and outputs the template signal Stp to the correlator 17.

The correlator 17 compares the received response signal Sin and the template signal Stp with respect to the delay amounts, especially in the delay device 13. The correlator 17 then generates a correlation signal Scm indicating the degree of correlation (similarity) between the signals, and outputs the correlation signal Scm to the decoder 19.

The decoder 19 deciphers and decodes the response signal Sin based on the correlation signal Scm, and outputs a decoded signal Sdc to the controller 10.

Based on the decoded signal Sdc, the controller 10 distinguishes the wireless tag TGn that has transmitted the received response signal Sin from the other wireless tags TGn in the manner described later. The controller 10 further determines the distance between the wireless tag TGn that has transmitted the response signal Sin and the interrogator PCn that has received the response signal Sin in the manner described later.

Meanwhile, the oscillator 20 in the power supply unit B generates an oscillation signal Sf indicating the predetermined frequency of the continuous wave, and outputs the oscillation signal Sf to the modulator 21.

Based on a control signal Scc from the controller 10, the modulator 21 performs a predetermined modulating process for the oscillation signal Sf, and outputs a modulated signal Se to the amplifier 22. (More specifically, the modulating process being an amplitude modulating process or the like to associate the identification number information or the like for each wireless tag TGn with the content of the identification number information or the like in a case where the continuous wave is transmitted as a carrier wave)

The amplifier 22 then performs a predetermined amplifying process for the modulated signal Se, and transmits the amplified signal as the electric signal Sbb to the narrow-band antennas 6 of each wireless tag TGn via the narrow-band antenna 23.

Referring now to FIG. 4A, the waveforms of the pulse signal and the response signal exchanged between each interrogator PCn and each wireless tag TGn will be described in detail.

The wideband antennas 1, 15, and 18 normally have differential characteristics with respect to a pulse wave to be transmitted or received. Therefore, if the pulse waveform of the pulse signal Sout before emitted from the wideband antenna 15 (which is a pulse waveform in compliance with the UWB method) is the same as a pulse wave P shown in the top row in FIG. 4A, the pulse waveform of the pulse signal immediately after emitted from the wideband antenna 15 is the same as a pulse wave Pout shown in the second row from the top in FIG. 4A, which is the waveform obtained by once differentiating the pulse wave P, because of the differential characteristics of the wideband antenna 15.

The pulse waveform of the pulse signal immediately after the pulse signal formed with the pulse wave Pout is received by the wideband antennas 1 of a wireless tag TGn (in other words, the pulse signal in the transmission path 2) is the same as a pulse wave Prv shown in the third row from the top in FIG. 4A, which is the waveform obtained by differentiating the pulse wave Pout once more, because of the differential characteristics of the wideband antennas 1.

The pulse waveform of the pulse signal immediately after the pulse signal reflected by the load impedance unit 3 is emitted by the wideband antennas 1 (in other words, the above-described response signal) is the same as a pulse wave Ptout shown in the fourth row from the top in FIG. 4A, which is the waveform obtained by differentiating the pulse wave Prv once more, because of the differential characteristics of the wideband antennas 1.

Lastly, the pulse waveform immediately after the response signal formed with the pulse wave Ptout is received by the wideband antenna 18 of the interrogator PCn (in other words, the above-described response signal Sin) is the same as a pulse wave Pin shown in the bottom row in FIG. 4A, which is the waveform obtained by differentiating the pulse wave Ptout once more, also because of the differential characteristics of the wideband antennas 18.

Referring now to FIG. 4B, the deciphering of the content of the response signal that is performed mainly by the correlator 17 after the response signal is received from a wireless tag TGn will be described in detail.

First, the template signal Stp output from the template pulse generator 16 is obtained in the following manner. A pulse signal having the same waveform as the pulse signal transmitted from the wideband antenna 15 is differentiated such a number of times as to have a waveform that is the same as or correlated with the response signal Sin transmitted from the wireless tag TGn to be distinguished and subjected to distance measurement or as to have a phase inverted waveform of such a waveform. In addition, the pulse signal is delayed by the delay amount equivalent to the time lapsing from the pulse signal receiving time until the response signal transmitting time in the transmission path 2 in the wireless tag TGn to be distinguished.

The correlator 17 compares the template signal Stp (see the waveform of the pulse Prv in FIG. 4A) with the response signal Sin that is actually input through the wideband antenna 18. When the correlation (phase correlation) between the response signal Sin and the template signal Stp is positive as shown in the upper row in FIG. 4B, the decoder 19 determines the content of the response signal Sin to be "1". When the correlation between the response signal Sin and the template signal Stp is negative as shown in the lower row in FIG. 4B, the decoder 19 determines the content of the response signal Sin to be "0". The decoded signal Sdc that corresponds to the determined value is then output to the controller 10.

Referring now to FIGS. 5A to 5D, the mechanism of distinguishing the wireless tags TGn from one another in the wireless communication system S in accordance with the first embodiment will be described in detail. FIG. 5A illustrates the structures of the wideband antennas 1, the transmission path 2, and the load impedance unit 3 of each of wireless tags TGn. FIG. 5B shows timing charts of a pulse signal and response signals to be transmitted to and received from the wireless tags TGn shown in FIG. 5A. In FIG. 5A, the control unit 4, the power supply unit 5, and the narrow-band antennas 6 of each of the wireless tags TGn are not shown. Also, the load impedance unit 3 of each of the wireless tags TG1 and TG2 shown in FIG. 5A is formed only with a switching element to be controlled by the control unit 4. The load impedance unit 3 of the wireless tag TG3 is formed with the transmission path 2 having the same length as the transmission path 2 of the wireless tag TG1, a switching element, and a resistor 3R for load matching, which are connected in series.

In FIG. 5B, the timing chart showing the waveform of the pulse signal P observed immediately before emitted from the wideband antenna 15 of an interrogator PCn is shown in the top row. The second row from the top in FIG. 5B shows the timing chart of the response signal Sin observed immediately after the pulse signal Sout is input to the wideband antenna 15, the pulse wave transmitted from the wideband antenna 15 is received and returned by the wireless tag TG1, and the corresponding response signal Sin is received by the wideband antenna 18 of the interrogator PCn. The third row from the top in FIG. 5B shows the timing chart of the response signal Sin observed immediately after the pulse signal Sout is input to the wideband antenna 15, the pulse wave transmitted from the wideband antenna 15 is received and returned by the wireless tag TG2, and the corresponding response signal Sin is received by the wideband antenna 18 of the interrogator PCn. The bottom row in FIG. 5B shows the timing chart of the response signal Sin observed immediately after the pulse signal Sout is input to the wideband antenna 15, the pulse wave transmitted from the wideband antenna 15 is received by the wireless tag TG3, and the corresponding response signal Sin is received by the wideband antenna 18 of the interrogator PCn.

As described above, the wireless tags TGn contained in the wireless communication system S of the first embodiment normally have the transmission paths 2 and the load impedance units 3 with different lengths from one another. Accordingly, the wireless tags TGn differ from one another in the period of time required between the time when a pulse signal transmitted from an interrogator PCn is received by the wideband antennas 1 of a wireless tag TGn and the time when the pulse signal is reflected by the load impedance unit 3 and is returned as a response signal from the wideband antennas 1.

More specifically, the case in which a pulse signal transmitted from an interrogator PCn is received by the wireless tag TG1 and a corresponding response signal is received by the interrogator PCn will be described in detail with reference to the left half of the top row and the left half of the second row from the top in FIG. 5B.

In a case where the switching element in the load impedance unit 3 of the wireless tag TG1 is open (OFF), when the pulse wave P (indicating the waveform prior to transmission, as will hereinafter be the same) shown in the left half of the top row in FIG. 5B is input to the wideband antenna 15 and is transmitted as the pulse signal Sout from the interrogator PCn, the transmitted pulse wave is received directly by the sideband antenna 18 of the interrogator PCn, and a received pulse wave Pin1 according to the directly received pulse wave is generated, as shown in the left half of the second row from the top in FIG. 5B. The pulse wave transmitted from the wideband antenna 15 is reflected by the wideband antennas 1 of the wireless tag TG1, and the reflected wave from the wideband antennas 1 is received as a reflected wave Pin2 by the interrogator PCn, as shown in the left half of the second row from the top in FIG. 5B. The time interval between the reception of the received pulse wave Pin1 and the reception of the reflected wave Pin2 depends on the distance between the interrogator PCn and the wireless tag TG1, and the distance can be determined by multiplying the time interval by the pulse wave speed. Following the reflected wave Pin2, the pulse signal received by the wideband antennas 1 is reflected by the load impedance unit 3, and is transmitted as a response signal from the wideband antennas 1. The transmitted response signal is received by the wideband antenna 18 of the interrogator PCn, and a received pulse wave Pin3 according to the transmitted response signal is generated, as shown in the left half of the second row from the top in FIG. 5B. Here, the reflected wave Pin2 has the same waveform as the pulse wave Pin shown in the bottom row in FIG. 4A. Since the load impedance unit 3 is open, a pulse wave of the same waveform as the reflected wave Pin2 is delayed by a time T1 required for reciprocation in the transmission path 2, and is received as the received pulse wave Pin3 by the interrogator PCn. If the template signal Stp shown in FIG. 4B is applied, the content of the received pulse wave Pin3 is "1".

Next, the case where a pulse signal transmitted from an interrogator PCn is received by the wireless tag TG2 and a corresponding response signal is received by the interrogator PCn will be described with reference to the left half of the top row in FIG. 5B and the left half of the third row from the top in FIG. 5B.

In a case where the switching element in the load impedance unit 3 of the wireless tag TG2 is open, the pulse wave P shown in the left half of the top row in FIG. 5B is input to the wideband antenna 15 and is transmitted as the pulse signal Sout from the interrogator PCn. In this case, a received pulse wave Pin1 according to the pulse wave received directly by the wideband antenna 18 is generated as shown in the left half of the third row from the top in FIG. 5B, as in the case of the wireless tag TG1. When the pulse wave transmitted from the wideband antenna 15 is reflected by the wideband antennas 1 of the wireless tag TG2, the reflected wave Pin2 from the wideband antennas 1 is received by the interrogator PCn accordingly, as shown in the left half of the third row from the top in FIG. 5B. Following the reflected wave Pin2, the pulse signal received by the wideband antennas 1 is reflected by the load impedance unit 3, and is transmitted as a response signal from the wideband antennas 1. The transmitted response signal is received by the wideband antenna 18 of the interrogator PCn, and a corresponding received pulse wave Pin3 is generated, as shown in the left half of the third row from the top in FIG. 5B. Since the load impedance unit 3 is open, a pulse wave of the same waveform as the reflected wave Pin2 is delayed by a time T2 (>T1) required for reciprocation in the transmission path 2 (longer than the transmission path 2 of the wireless tag TG1) of the wireless tag TG2, and is received as the received pulse wave Pin3 by the interrogator PCn. If the template signal Stp shown in FIG. 4B is used, the content of the received pulse wave Pin3 is "1".

Lastly, the case in which a pulse signal transmitted from an interrogator PCn is received by the wireless tag TG3 and a corresponding response signal is received by the interrogator PCn will be described with reference to the left half of the top row in FIG. 5B and the left half of the bottom row in FIG. 5B.

In a case where the switching element in the load impedance unit 3 of the wireless tag TG3 is open, the load matching function of the resistor 3R is not activated. When the pulse wave P shown in the left half of the top row in FIG. 5B is input to the wideband antenna 15 and is transmitted as the pulse signal Sout from the interrogator PCn, a received pulse wave Pin1 according to the pulse wave received directly by the wideband antenna 18 is generated as shown in the left half of the bottom row in FIG. 5B, as in the case of the wireless tag TG1 or TG2. When the pulse wave transmitted from the wideband antenna 15 is reflected by the wideband antennas 1 of the wireless tag TG3, the reflected wave Pin2 from the wideband antennas 1 is received by the interrogator PCn accordingly, as shown in the left half of the bottom row in FIG. 5B. Following the reflected wave Pin2, the pulse signal received by the wideband antennas 1 is reflected by the load impedance unit 3, and is transmitted as a response signal from the wideband antennas 1. The transmitted response signal is received by the wideband antenna 18 of the interrogator PCn, and a corresponding received pulse wave Pin3 is generated, as shown in the left half of the bottom row in FIG. 5B. Since the load impedance unit 3 is open and the received pulse wave Pin3 is not affected by the existence of the resistor 3R, a pulse wave of the same waveform as the reflected wave Pin2 is delayed by a time T3 (=time T1) required for reciprocation in the transmission path 2 (having the same length as the transmission path 2 of the wireless tag TG1) of the wireless tag TG3, and is received as the received pulse wave Pin3 by the interrogator PCn. If the template signal Stp shown in FIG. 4B is used, the content of the received pulse wave Pin3 is "1".

Next, a case where the switching element in the load impedance unit 3 of each of the wireless tags TG1 to TG3 is short-circuited (ON) will be described with reference to FIGS. 5A and 5B.

First, a case where a pulse signal transmitted from an interrogator PCn is received by the wireless tag TG1 and a response signal according to the pulse signal is received by the interrogator PCn will be described, with reference to the right half of the upper row in FIG. 5B.

In a case where the switching element in the load impedance unit 3 of the wireless tag TG1 is short-circuited, the pulse wave P shown in the right half of the top row in FIG. 5B is input to the wideband antenna 15 and is transmitted as the pulse signal Sout from the interrogator PCn. In this case, a received pulse wave Pin 1 according to the pulse wave received directly by the wideband antenna 18 is generated, as shown in the right half of the second row from the top in FIG. 5B, as in the case of the left half of FIG. 5B. The pulse wave transmitted from the wideband antenna 15 is reflected by the wideband antennas 1 of the wireless tag TG1, and accordingly, the reflected wave Pin2 from the wideband antennas 1 is received by the interrogator PCn, as shown in the right half of the second row from the top in FIG. 5B. Following the reflected wave Pin2, the pulse signal received by the wideband antennas 1 is reflected by the load impedance unit 3, and is transmitted as a response signal from the wideband antennas 1. The transmitted response signal is received by the wideband antenna 18 of the interrogator PCn, and a received pulse wave Pin3 according to the transmitted response signal is generated, as shown in the right half of the second row from the top in FIG. 5B. Here, the reflected wave Pin2 has the same waveform as the pulse wave Pin shown in the bottom row in FIG. 4A. Since the load impedance unit 3 is short-circuited, a pulse wave having the inverted polarity with respect to the reflected wave Pin2 is delayed by the time T1 required for reciprocation in the transmission path 2, and is received as the received pulse wave Pin3 by the interrogator PCn. If the template signal Stp shown in FIG. 4B is used, the content of the received pulse wave Pin3 is "0".

Next, a case where a pulse signal transmitted from an interrogator PCn is received by the wireless tag TG2 and a response signal in accordance with the pulse signal is received by the interrogator PCn will be described with reference to the right half of the top row in FIG. 5B and the right half of the third row from the top in FIG. 5B.

In a case where the switching element in the load impedance unit 3 of the wireless tag TG2 is short-circuited, the pulse wave P shown in the left half of the top row in FIG. 5B is input to the wideband antenna 15 and is transmitted as the pulse signal Sout from the interrogator PCn. In this case, a received pulse wave Pin1 according to the pulse wave received directly by the wideband antenna 18 is generated as shown in the right half of the third row from the top in FIG. 5B, as in the case of the wireless tag TG1. When the pulse wave P transmitted from the wideband antenna 15 is reflected by the wideband antennas 1 of the wireless tag TG2, the reflected wave Pin2 from the wideband antennas 1 is received by the interrogator PCn accordingly, as shown in the right half of the third row from the top in FIG. 5B. Following the reflected wave Pin2, the pulse signal received by the wideband antennas 1 is reflected by the load impedance unit 3, and is transmitted as a response signal from the wideband antennas 1. The transmitted response signal is received by the wideband antenna 18 of the interrogator PCn, and a received pulse wave Pin3 according to the transmitted response signal is generated, as shown in the right half of the third row from the top in FIG. 5B. Since the load impedance unit 3 is short-circuited, a pulse wave having the inverted polarity with respect to the reflected wave Pin2 is delayed by a time T2 (>time T1) required for reciprocation in the transmission path 2 of the wireless tag TG2, and is received as the received pulse wave Pin3 by the interrogator PCn. If the template signal Stp shown in FIG. 4B is used, the content of the received pulse wave Pin3 is "0".

Lastly, a case where a pulse signal transmitted from an interrogator PCn is received by the wireless tag TG3 and a response signal in accordance with the pulse signal is received by the interrogator PCn will be described with reference to the right half of the top row in FIG. 5B and the right half of the bottom row in FIG. 5B.

In a case where the switching element in the load impedance unit 3 of the wireless tag TG3 is short-circuited, the load matching function of the resistor 3R is activated. When the pulse wave P shown in the right half of the top row in FIG. 5B is input to the wideband antenna 15 and is transmitted as the pulse signal Sout from the interrogator PCn, a received pulse wave Pin1 according to the pulse wave P received directly by the wideband antenna 18 is generated as shown in the right half of the bottom row in FIG. 5B, as in the case of the wireless tag TG1 or TG2. When the pulse wave transmitted from the wideband antenna 15 is reflected by the wideband antennas 1 of the wireless tag TG3, the reflected wave Pin2 from the wideband antennas 1 is received by the interrogator PCn accordingly, as shown in the right half of the bottom row in FIG. 5B. Following the reflected wave Pin2, the pulse signal received by the wideband antennas 1 is not reflected by the load impedance unit 3, and is not transmitted as a response signal from the wideband antennas 1. Accordingly, a transmitted response signal is not received by the wideband antenna 18 of the interrogator PCn, and a received pulse wave Pin3 according to the response signal is not generated as shown in the right half of the bottom row in FIG. 5B. Since the load impedance unit 3 is short-circuited and the resistor 3R functions as a resistor having a load matching function, the received pulse wave Pin3 is not reflected by the load impedance unit 3, and a response signal is not transmitted from the wireless tag TG3. As a result, a pulse wave equivalent to the received pulse wave Pin3 in the case of the wireless tag TG1 or TG2 is not received by the interrogator PCn.

In the bottom row in FIG. 5B, the received pulse wave Pin3 of the same polarity as that of the received pulse wave Pin2 is used. However, in a wireless tag TG4 having the structure shown in FIG. 5C, a received pulse wave Pin3 of the reversed polarity from the polarity of the received pulse wave Pin2 can be used. In a wireless tag TG5 having the structure shown in FIG. 5D, a pulse wave of the same polarity as the received pulse wave Pin2, a pulse wave of the reversed polarity from the received pulse wave Pin2, or no reflected light can be selected to perform a communication with the three values, so that the capacity of transmission can be increased.

As described above, the wireless tags TG1 to TG3 in accordance with the first embodiment have the transmission paths 2 with different lengths and load impedance units 3 with different structures. Therefore, the timing of reception of the received pulse wave Pin3, the waveform of the received pulse wave Pin3, and the existence of the received pulse wave Pin3 vary in the interrogator PCn among the wireless tags TG1 to TG3. In this manner, the interrogator PCn can identify each of the wireless tags TG1 to TG3.

Referring now to FIG. 6, the structure of a wireless tag TGn in accordance with the first embodiment is described in detail. Note that the same components as those shown in FIG. 2 are denoted by the same reference numerals as those in FIG. 2, and explanation of them will not be described in the following.

As shown in FIG. 6, the load impedance unit 3 of a wireless tag TGn of the first embodiment includes a diode 30 (connected in series to the transmission path 2) that functions as the switching element shown in FIG. 2, and two coils (or inductance elements) 31 that are connected to the two terminals of the diode 30 and the control unit 3.

In this structure, when a DC bias is applied to the diode 30 under the control of the control unit 4, the diode 30 is short-circuited. When the application of the DC bias is stopped, the diode 30 is opened. In this manner, the diode 30 functions as the switching element. The coils 31 prevent application of other components than the DC bias to the diode 30, and also prevent each pulse signal from reaching the control unit 4 from the transmission path 2. By doing so, when the application of the DC bias is stopped, the diode 30 opens the load impedance unit 3 for each pulse signal.

The power supply unit 5 of each wireless tag TGn includes a rectifying circuit 32 and a matching circuit 33. The rectifying circuit 32 includes capacitors 40 and 41, and diodes 42 and 43.

Here, the matching circuit 33 performs matching between the narrow-band antenna 6 with respect to the electric signal received by the narrow-band antennas 6. The power conveyed by the electric signal is output to the rectifying circuit 32.

The rectifying circuit 32 then uses the functions of the capacitors 40 and 41 and the diodes 42 and 43 to convert the electric signal, which is an AC signal, into a DC signal for driving the control unit 4.

In this manner, the application of the DC bias to the diode 30 in the load impedance unit 3 is started and stopped under the control of the control unit 4, so that the diode 30 can function as the switching element shown in FIG. 2. Through the switching on and off of the switching element, the content of each response signal received by an interrogator PCn is switched between "1" (where the switching element is open) and "0" (where the switching element is short-circuited), as shown in FIGS. 4B and 5B.

In the above described structure of a wireless tag TGn, the diode 30 of the load impedance unit 3 may be formed with an FET (Field Effect Transistor). Also, the matching circuit 33 may be removed, or may be integrally formed with the narrow-band antennas 6.

Referring now to FIG. 7, the timings of switching on and off of the switching element and the timings of pulse signal transmissions from an interrogator PCn are described in detail.

As shown in FIG. 7, only one pulse wave P of a single pulse forming a pulse signal Sout generated in each interrogator PCn is transmitted from the interrogator PCn in each one of time slots TS that have constant lengths and are preset on a time axis. Here, the timing in which the pulse wave P is transmitted in each time slot TS is determined randomly with the pseudo random code (more specifically, with so-called M sequences and Gold sequences that are pseudo random). Therefore, in the above described delay device 11, the clock signal Sc1 is delayed with the pseudo random code. Each of the intervals at which the pulse wave P is transmitted from the interrogator PCn is set longer than the time determined by dividing the length of the longest transmission path 2 among the transmission paths 2 of the wireless tags TGn by the speed at which the pulse signal and the response signal received by each wireless tag TGn are transmitted through the transmission path 2.

Meanwhile, the switching on and off of the switching element of each wireless tag TGn is performed in synchronization with the timings of the starts of the time slots TS in each interrogator PCn. In the example illustrated in FIG. 7, the timings of switching on and off of the switching element are defined for each of the five time slots TS. Therefore, the clock signal Sc1, on which the switching timings of the time slots TS in each interrogator PCn are based, needs to be in synchronization with the clock signal on which the switching on and off of the switching element are based.

In the example illustrated in FIG. 7, when the switching element is switched once, pulse signals corresponding to at least five pulse waves P are transmitted to wireless tags TGn. Each of the wireless tags TGn that receive the pulse signals transmits a response signal five times, so that each wireless tag TGn can be identified with accuracy even if there is noise entering from the outside of the wireless communication system S.

At this point, the correlation in accordance with the pseudo random code is determined, so as to remove noise and other signal components not related to the correlation. Accordingly, high detection can be performed. Thus, the communication distance between each interrogator PCn and each wireless tag TGn can be made longer.

Also, by switching on and off the switching element of each wireless tag TGn, as shown in FIG. 7, 4-bit information can be transmitted as a response signal bit by bit from each wireless tag TGn to an interrogator PCn at regular intervals. In the example case shown in FIG. 7, the contents of response signals to be received by an interrogator PCn vary from "1" to "0" to "0" to "1" at the intervals of five time slots TS.

If the lengths and the number of time slots TS are set so that the pseudo random code repeats twice or more in one cycle of switching on and off the switching element, the pseudo random codes of one cycle or more can be certainly detected within one cycle of switching on and off the switching element. Accordingly, it becomes unnecessary to maintain synchronization between the time slots TS and the activation of the switching element.

Referring now to FIG. 8, the relationship between the transmission of the pulse signal from the wideband antenna 15 and the transmission of the electric signal from the narrow-band antenna 23 of an interrogator PCn is described in detail.

The pulse wave Pout and the electric signal Sbb are transmitted in a time-sharing manner from an interrogator PCn of the first embodiment. At the time of electric signal transmission, the electric signal Sbb is received by the narrow-band antenna 6 of each wireless tag TGn, so that the wireless tag TGn is electrically charged. During the time following the transmission of the pulse wave Pout, the response signal is received by the interrogator PCn.

More specifically, when an electric signal time slot CT in which the electric signal Sbb should be transmitted from the narrow-band antenna 23 comes to an end (or when a sufficient amount of power to electrically charge the wireless tag TGn is supplied), a pulse signal time slot PT in which the pulse wave Pout is transmitted from the wideband antenna 15 starts, as shown in FIG. 8. When the pulse signal time slot PT comes to an end, a blank time slot BT for separating the pulse signal time slot PT from the next electric signal time slot CT in compliance with the UWB method starts. Here, using the blank time slot BT, the interrogator PCn receives the response signal. When the blank time slot BT comes to an end, the next electric signal time slot CT starts.

As the electric signal Sbb and the pulse wave Pout are alternately transmitted in the above described manner, the pulse wave Pout can be transmitted in each time slot TS while necessary charging is performed in each wireless tag TGn.

In the above described structure of each interrogator PCn, the electric signal Sbb totally differs from the pulse wave Pout. Accordingly, the electric signal Sbb may be transmitted by the so-called frequency hopping technique. In such a case, a continuous wave that is the electric signal Sbb is amplified and modulated, so that the information such as ID information for identifying each wireless tag TGn can be transmitted to each wireless tag TGn.

In a case where information transmission and reception between the interrogators PCn are performed with radiowave, each wireless tag TGn may receive the radiowave as the electric signal Sbb.

As described above, in the operation of the wireless communication system S of the first embodiment, each wireless tag TGn has the wideband antennas 1 and the load impedance unit 3 connected with the transmission path 2 having the predetermined length. Accordingly, the manners of transmitting response signals generated based on pulse signals (or the waveforms and transmission timings of response signals) vary with the lengths of the transmission paths and the load impedances of the wireless tags TGn. As a result, each wireless tag TGn can be identified based on the waveform of the response signal, and the distance to each wireless tag TGn can be detected based on the transmission timing. Since each response signal is generated when a pulse signal is received through the wideband antennas 1, each wireless tag TGn can be identified and the distance to each wireless tag TGn can be detected without the use of carrier waves. Thus, the system can be made smaller in size and have less power consumption, while each wireless tag TGn can be identified and the distance to each wireless tag TGn can be detected.

Since the wideband antennas 1 are connected to the load impedance unit 3 with the transmission path 2 that has a different length from the transmission path 2 of any other wireless tag TGn, the manners of transmitting response signals generated from pulse signals received by the wireless tags TGn, or the manners of receiving the response signals transmitted from the wireless tags TGn to an interrogator PCn (the signal waveforms of the respective response signals and the reception timings in the interrogators) can be made differ from one wireless tag TGn from another by making the lengths of the transmission paths 2 differ from one wireless tag TGn from another. As a result, while the respective wireless tags TGn can be distinguished from one another based on the differences among the signal waveforms, the distances from an interrogator PCn to the respective wireless tag TGn can also be detected based on the differences among the reception timings.

Furthermore, since the characteristic impedance is constant regardless of the lengths of the transmission paths 2, the waveforms of the response signals and the timings of transmitting the response signals do not vary. Accordingly, unnecessary reflection is not caused in the transmission paths 2. Thus, each wireless tag TGn can be identified, and the distance to each wireless tag TGn can be detected with high precision.

Moreover, since the length of the transmission path 2 is equal to or greater than a half the value obtained by multiplying the speed at which each signal is transmitted in the transmission path 2 by the time equivalent to the pulse width of the pulse signal, response signals are distinguished from reflected waves reflected or emitted in accordance with pulse signals from the wideband antennas 1 in the wireless tags TGn. Thus, each wireless tag TGn can be identified, and the distance to each wireless tag TGn can be detected with high precision.

As the control unit 4 controls a pulse reflection coefficient in accordance with the received pulse signal, the manner of transmitting the response signal transmitted from each wireless tag TGn can be varied later in accordance with the information to be received. Thus, a multi-bit response signal can be generated and transmitted.

Since the electric signal Sbb as a continuous wave is received by each wireless tag TGn to obtain electric power, external power supplies such as batteries are made unnecessary. Thus, the size of each wireless tag TGn can be further reduced, and the operation costs also be reduced.

Furthermore, since electric power is supplied by way of the electric signal Sbb that is different from the pulse signal for sending and receiving information, power can be efficiently generated in each wireless tag TGn.

Meanwhile, each interrogator PCn receives the response signal from each wireless tag TGn through the wideband antenna 18, and identifies each wireless tag TGn through comparison between the response signal and the template signal Stp. Accordingly, each wireless tag TGn can be identified and the distance to each wireless tag TGn can be detected. Also, since no carrier waves are used, the size and power consumption of each interrogator PCn can be reduced.

Further, in each interrogator PCn, the delay device 11 delays the clock signal Sc1, so as to generate the pulse signal. The delay device 13 then delays the clock signal Sc1 by a different delay amount from that of the delay device 11, so as to generate the template signal Stp. The correlation between the template signal Stp and the response signal Sin is then determined, so as to accurately detect the content of the response signal Sin and also detect the time intervals of the reflected signals and response signals.

The clock signal Sc1 is delayed in the above described delay timings, based on the pseudo random code. Accordingly, pulse overlapping between response signals transmitted from the wireless tags TGn can be prevented.

As the pulse signal intervals are varied with the pseudo random code, cyclic peaks are not caused in the transmission spectrum. As a result, adverse influence on other wireless communication such as the communication among the interrogators PCn can be prevented.

Since a signal is detected by determining the correlation in accordance with the pseudo random code, highly accurate detection can be performed, and the distance of communication can be extended.

Further, continuous pulse signals are reflected by the load impedance unit 3 that functions as a short circuit or an open circuit, and the response signals are received by an interrogator PCn. Accordingly, the signal-to-noise ratio of the decoded signal Sdc that is output from the decoder 19 is higher than in a case where information is transmitted and received with only a single pulse signal. Thus, the communication distance between each interrogator PCn and each wireless tag TGn can be prolonged.

Furthermore, since each wireless tag TGn is identified based on the intervals of the detected response signals, the identifying can be performed with high accuracy.

Also, since the contents of the response signals are recognized by determining the polarity of each response signal in each interrogator PCn, the recognition can be performed with accuracy by each interrogator PCn with a simple structure.

(II) Second Embodiment

Figure 9:
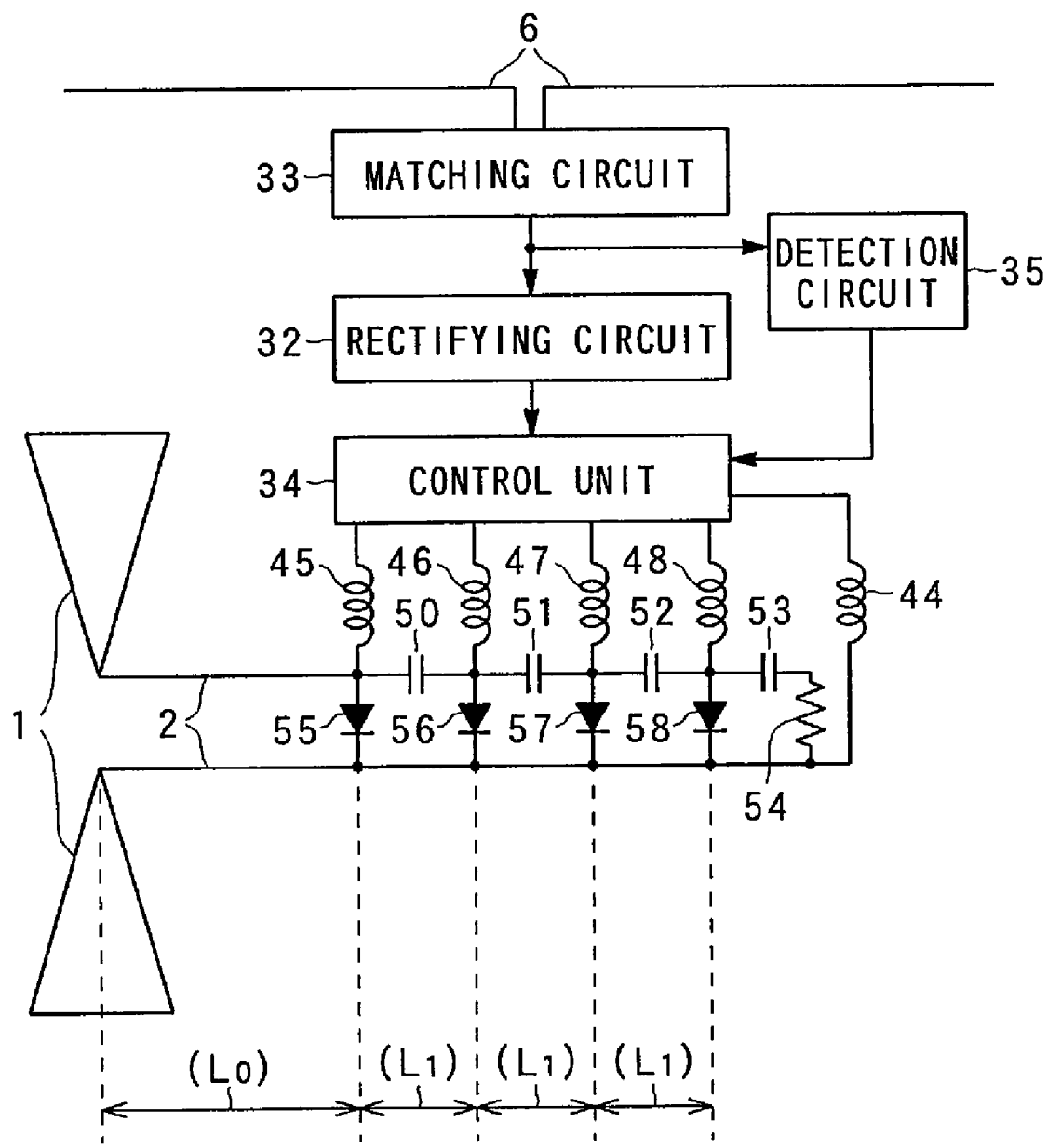
FIG. 9 is a circuit diagram schematically showing the structure of a wireless tag in accordance with a second embodiment of the present invention.

Referring now to FIG. 9 and FIG. 10, a second embodiment of the present invention is described.

FIG. 9 illustrates the structure of a wireless tag in accordance with the second embodiment. FIGS. 10A and 10B show the correlations with response signals from the wireless tag. In FIG. 9, the same components as those of the wireless tag of the first embodiment shown in FIG. 2 are denoted by the same reference numerals as those in FIG. 2, and explanation of them is not described herein.

In the above described first embodiment, the wireless tags have transmission paths of constant lengths. However, so-called diode switches may be connected in parallel to the wideband antenna, so that the length of the transmission path of each one wireless tag can be controlled.

More specifically, as shown in FIG. 9, each wireless tag TGGn in accordance with the second embodiment includes a detection circuit 35, a control unit 34 as a length control unit, five coils (or inductance elements) 44 through 48, four capacitors 50 through 53, a resistor 54, and four diodes 55 through 58, as well as a wideband antenna 1, a transmission path 2, a narrow-band antenna 6, a matching circuit 33, and a rectifying circuit 32, which are the same as those of each wireless tag TGn in accordance with the first embodiment.

Here, the length of the transmission path 2 is set greater than the length expressed as:

$$L_0 = \text{(transmission speed of response signal)} \times \text{(pulse width of received pulse signal)}/2,$$

and may vary among the wireless tags TGGn. However, each of the intervals at which the diodes 55 through 58 are arranged in a direction parallel to the transmission path 2 is expressed as:

$$L_1 = \text{(transmission speed of response signal)} \times \text{(pulse width of received pulse signal)}/4.$$

Here, the transmission speed of response signals is the transmission speed at which a pulse is transmitted through the transmission path 2.

As in each wireless tag TGn of the first embodiment, the coils 44 through 48 apply only a DC bias to each of the diodes 55 through 58, and also serve as the filters for preventing pulse waves reaching the control unit 34. The capacitors 50 through 53 let the pulse waves pass, and cut off the DC components separating the DC biases from one another. The loads at the ends of the transmission path 2 should preferably be matched by the resistor 54, so as to prevent unnecessary reflection.

Based on the detection signals indicating the intervals at which the electric signal Sbb is transmitted from the detection circuit 35, and the contents of the identification information as to the wireless tag TGGn, the control unit 34 makes one of the diodes short-circuited and leaves the other diodes open, so that the length of the transmission path in the wireless tag TGGn can be varied among four lengths (more specifically, length $L_0$, length ($L_0+L_1$), length ($L_0+2L_1$), and length ($L_0+3L_1$)).

In this case, response signal reception in each interrogator PCn is performed as follows. The control unit 34 performs a switching control operation, so as to short-circuit the diodes 55 through 58 one by one, starting from the diode 55, in the wireless tag TGGn. Accordingly, the response signals Sin each shifted by ½ of the pulse width $T_p$ of the pulse signal are received as shown in FIGS. 10A and 10B. The correlator 17 obtains the correlations between the response signals and the template signal Stp1 shown in FIG. 10A or the template signal Stp2 shown in FIG. 10B, so as to determine the content of each response signal Sin to be "1" or "0".

As described above, with the wireless tag TGGn in accordance with the second embodiment, the same effects as those achieved with the wireless communication system S in accordance with the first embodiment can be achieved. Furthermore, the effective length of the transmission path is adjusted based on the signal state of the response signal to be transmitted from the wireless tag TGGn, the manner of transmission for the response signal to be transmitted from each wireless tag TGGn can be changed in accordance with the information to be transmitted. Thus, multi-bit response signals can be generated and transmitted.

Also, the length of the transmission path is set to the length equivalent to the value obtained by multiplying the speed at which each signal is transmitted in the transmission path by the period of time equivalent to the pulse width of each pulse signal, and then adding N/4 of the multiplication result to a half the multiplication result. Accordingly, each wireless tag TGGn can be identified with accuracy, and the distance to each wireless tag TGGn can be detected.

(III) Modified Mode According to the First and Second Embodiment Modifications of the First and Second Embodiments Next, modifications of the first and second embodiments are described.

Figure 11A:
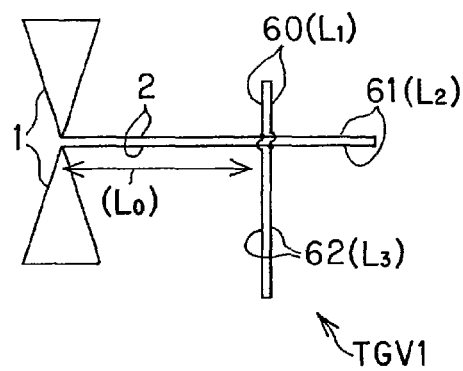
FIGS. 11A to 11D show a wireless tag in accordance with a first modification of the first and second embodiments, where
Figure 11B:
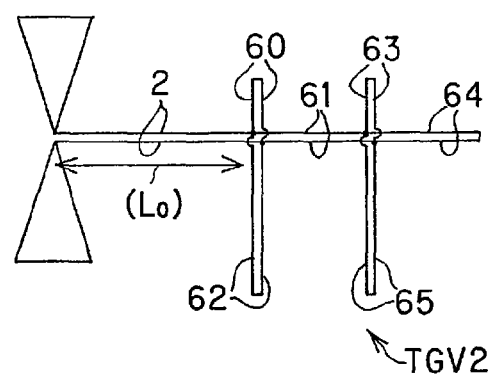

In a first modification of each of the first and second embodiments, each wireless tag may be a wireless tag TGV1 shown in FIG. 11A, or a wireless tag TGV2 shown in FIG. 11B.

Here, the wireless tag TGV1 includes transmission paths 60 through 62 that are formed with parallel lines and have different lengths from one another, as well as the wideband antennas 1 and the transmission path 2 that are the same as those of each wireless tag TGn of the first embodiment. The transmission paths 60 through 62 are electrically connected to one another, with the opposite end of the transmission path 2 from the wideband antennas 1 being the center of those transmission paths 60 through 62. With this arrangement, the wireless tag TGV1 has three transmission routes: a first transmission route consisting of the transmission path 2 and the transmission path 60; a second transmission route consisting of the transmission path 2 and the transmission path 61; and a third transmission route consisting of the transmission path 2 and the transmission path 62.

The wireless tag TGV1 does not include a circuit element that requires electric power, such as the switching element in each wireless tag TGn of the first embodiment, and the content of a response signal to be transmitted to an interrogator PCn is constant. The ends of the transmission paths 60 through 62 are left open or short-circuited or load-matched, so as to vary the contents of response signals among wireless tags TGV1.

Meanwhile, in addition to the above described arrangement of the wireless tag TGV1, the wireless tag TGV2 includes transmission paths 63 through 65 that are formed with parallel lines at the end of the transmission path 61 and have different lengths from one another. With this arrangement, the wireless tag TGV1 has five transmission routes: a first transmission route consisting of the transmission path 2 and the transmission path 60; a second transmission route consisting of the transmission path 2, the transmission path 61, and the transmission path 63; a third transmission route consisting of the transmission path 2, the transmission path 61, and the transmission path 64; a fourth transmission route consisting of the transmission path 2, the transmission path 61, and the transmission path 64; and a fifth transmission route consisting of the transmission path 2 and the transmission path 62. The wireless tag TGV2 does not include a circuit element that requires electric power, and the content of a response signal to be transmitted to an interrogator PCn is constant.

The transmission paths 60 through 65 have lengths that are natural number multiples of the length of the shortest transmission path 60. The length of the transmission path 60 varies among the wireless tags TGV1 or TGV2.

In each of the wireless tags TGV1 and TGV2, each transmission path is equivalent to the transmission unit of the claimed invention.

Figure 11C:
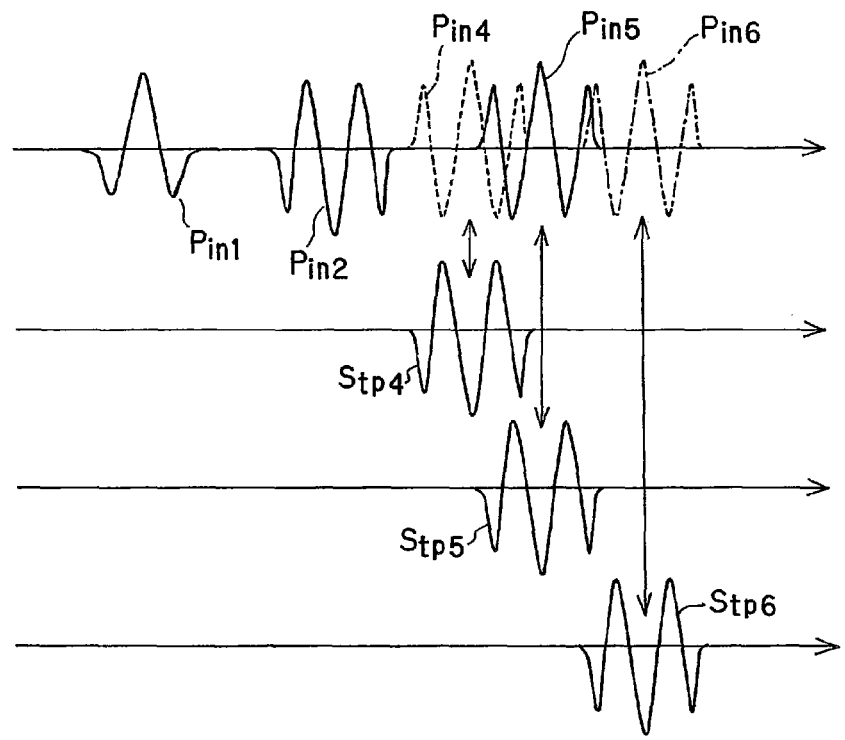

Referring now to FIG. 11C, the waveforms observed in a case where response signals from the wireless tag TGV1 are received by an interrogator PCn are described. In the following description, the relation, $$L_1 < L_2 < L_3$$

is established, where $L_1$ represents the length of the transmission path 60, $L_2$ represents the length of the transmission path 61, and $L_3$ represents the length of the transmission path 62 of the wireless tag TGV1.

When the pulse wave P shown in FIG. 5B is input to the wideband antennas 1 as a pulse signal from an interrogator PCn, the received pulse wave Pin1 and the reflected wave Pin2 shown in FIG. 5B are received. Received pulse waves Pin4 through Pin6 are then received with time interval as response signals from the wireless tag TGV1. Here, the received pulse wave Pin4 is the wave transmitted through the first transmission route, or the wave transmitted through a transmission path having the length ($L_0+L_1$) obtained by adding the length of the transmission path 60 to the transmission path 2 of the wireless tag TGV1. The received pulse wave Pin5 is the wave transmitted through the second transmission route, or the wave transmitted through a transmission path having the length ($L_0+L_2$) obtained by adding the length of the transmission path 61 to the transmission path 2 of the wireless tag TGV1. The received pulse wave Pin6 is the wave transmitted through the third transmission route, or the wave transmitted through a transmission path having the length ($L_1+L_3$) obtained by adding the length of the transmission path 62 to the transmission path 2 of the wireless tag TGV1.

With the above described structure, the transmission routes have various lengths ((the transmission path 2+the transmission path 60), (the transmission path 2+the transmission path 61), and (the transmission path 2+the transmission path 62)), and the ends of the transmission routes are left open or short-circuited. Thus, in response to one pulse signal, multi-bit response signals can be returned.

Depending on the value of the length $L_1$ of the transmission path 60, the some parts of the received pulse waves Pin4 through Pin6 might overlap with one another, as shown in the top row in FIG. 11C. However, the correlations between the received pulse waves Pin4 through Pin6 and template signals Stp4 through Stp6 generated independently of one another are determined, so as to separate the received pulse waves Pin4 through Pin6 from one another and detect the contents of the received pulse waves Pin4 through Pin6 as response signals. Here, the template signal Stp4 is a template signal for the received pulse signal Pin4, the template signal Stp5 is a template signal for the received pulse signal Pin5, and the template signal Stp6 is a template signal for the received pulse signal Pin6.

As described above, since the wireless tag TGV1 and the wireless tag TGV2 as the first modification of the first and second embodiments each have transmission routes of different lengths, multi-bit response signals can be generated and transmitted with a simple structure.

Furthermore, the transmission path 2 of the wireless tag TGV1 functions as at least a part of each of the transmission routes of various lengths, and the transmission path 2 and the transmission path 61 of the wireless tag TGV2 function as at least a part of each of the transmission routes of various lengths. Accordingly, each of the wireless tags TGV1 and TGV2 can be made smaller in size, while the transmission routes of various lengths can be obtained.

Figure 12:
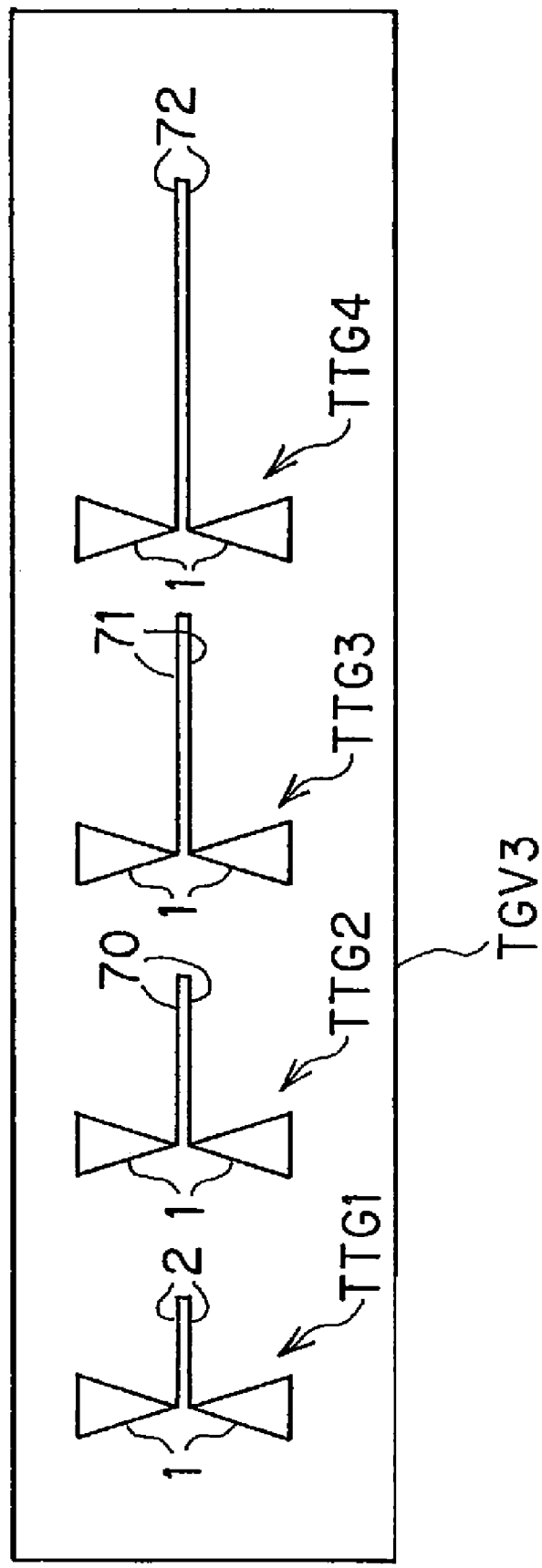
FIG. 12 is a circuit diagram schematically showing the structure of still another wireless tag in accordance with the first modification of the first and second embodiments.

As a further modification of the above described first modification of the first and second embodiments, a wireless communication system may be formed with a wireless tag TGV3 that contains elemental wireless tags TTG1 through TTG4 having transmission paths 2 and 70 through 72 of various lengths connected to the wideband antennas 1 that are identical among the elemental wireless tags TTG1 through TTG4, as shown in FIG. 12.

In this case, the transmission paths 2 and 70 through 72 have different lengths from one another, and the ends of the transmission paths 2 and 70 through 72 are left open or short-circuited. Although the wireless tag TGV3 is somewhat large in size, it can generate and transmit, in response to one pulse signal, multi-bit response signals to an interrogator PCn through a very simple structure.

Figure 11D:
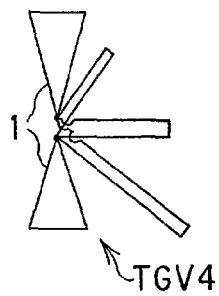

Further, the same effects as above can be achieved with a wireless tag TGV4 that does not have the common transmission path 2, as shown in FIG. 11D.

Figure 13A:
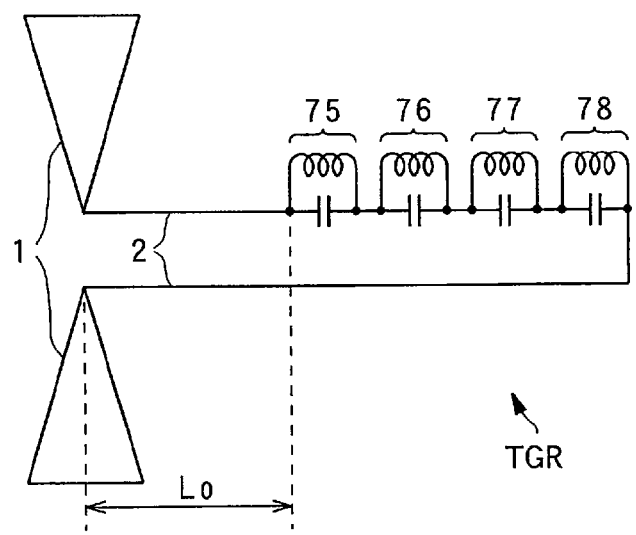
FIGS. 13A and 13B schematically show the structure of a wireless communication system in accordance with a second modification of the first and second embodiments, where

FIG. 13A illustrates a wireless tag TGR as a second modification of the first and second embodiments. In addition to the wideband antennas 1 and the transmission path 2 of the first embodiment, the wireless tag TGR includes resonance circuits 75 through 78 that are formed with coils (or inductance elements) and capacitors and are connected in series to the transmission path 2. The resonance circuits 75 through 78 are resonated at different resonant frequencies from one another, so as to deform each received pulse signal. It is necessary to use a different resonant frequency for each wireless tag TGR, so that the wireless tags TGR can be distinguished from one another.

Since ultrawideband frequencies are used in accordance with the UWB method in this wireless tag TGR, multi-bit response signals can be generated with resonance circuits having relatively low Q values. Accordingly, the resonance circuits 75 through 78, the wideband antennas 1, and the transmission path 2 can be formed as thin films or thick films by a printing technique or the like. In this case, the components other than the wideband antennas 1 should preferably be formed with microstrip lines or parallel lines, so as to suppress reflection.

Figure 13B:
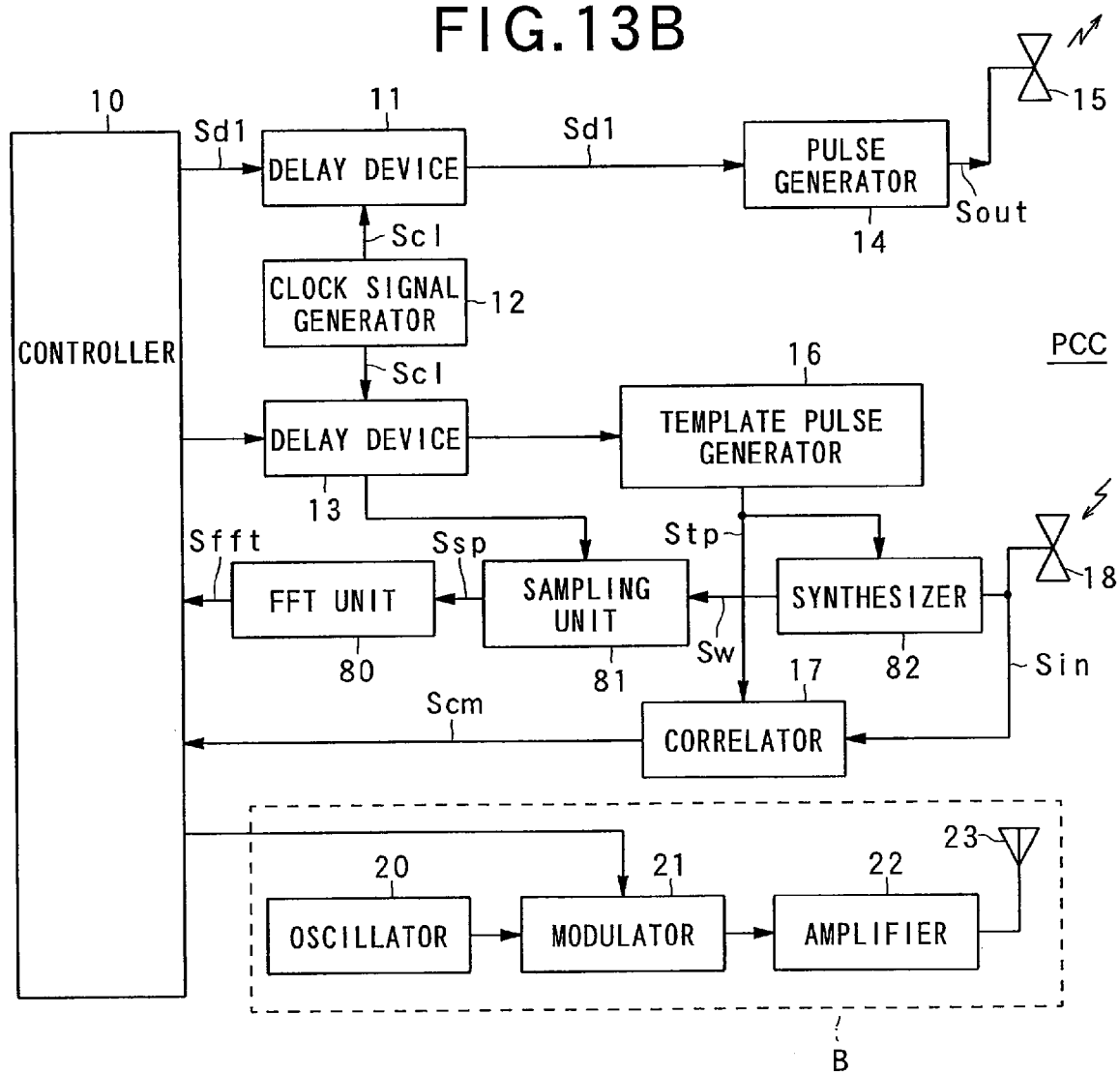

An interrogator to be contained in a wireless communication system having the above described wireless tag TGR should have the structure shown in FIG. 13B.

An interrogator PCC in accordance with the second modification of the first and second embodiments includes a synthesizer 82, a sampling unit 81, and a FFT (Fast Fourier Transform) unit 80 as an analyzing unit, as well as the controller 10, the delay devices 11 and 13, the clock signal generator 12, the pulse generator 14, the wideband antennas 15 and 18, the template pulse generator 16, the correlator 17, and the power supply unit B of each interrogator PCn of the first embodiment.

When the interrogator PCC having this structure receives a response signal Sin from a wireless tag TGR, the synthesizer 82 combines the response signal Sin with a template signal Stp generated by the template pulse generator 16, so as to generate a combined signal Sm. The sampling unit 81 performs sampling on the combined signal Sm by shifting the timings of the pulse waves contained in the combined signal Sm, so as to generate a sampling signal Ssp. The FFT unit 80 performs a FFT operation on the sampling signal Ssp, so as to generate a FFT signal Sfft and output the FFT signal Sfft to the controller 10.

Based on the FFT signal Sfft, the controller 10 determines which frequency component has been changed, so as to identify the wireless tag TGR. Meanwhile, based on the content of a correlation signal Scm from the correlator 17, the distance from the interrogator PCC to the wireless tag TGR can be detected.

Figure 14A:
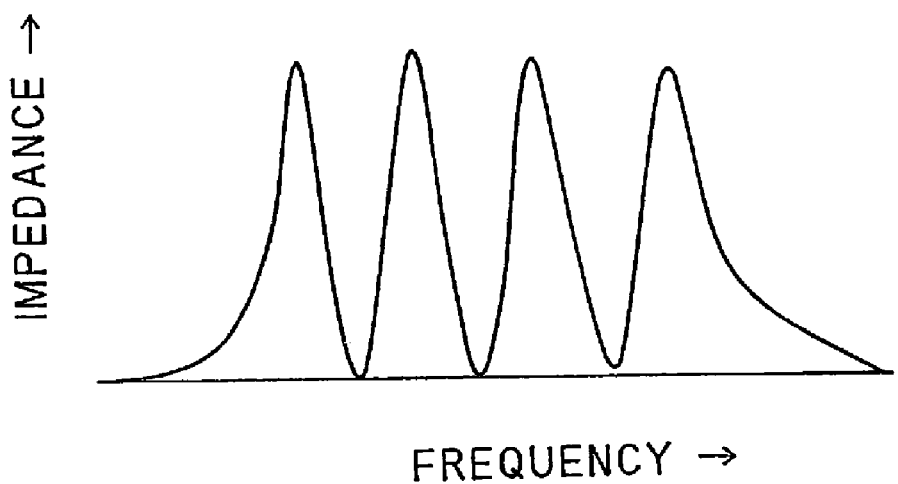
FIGS. 14A to 14C are respectively first, second and third waveform charts illustrating the mechanism of identification of wireless tags in accordance with the second modification of the first and second embodiments.
Figure 14B:
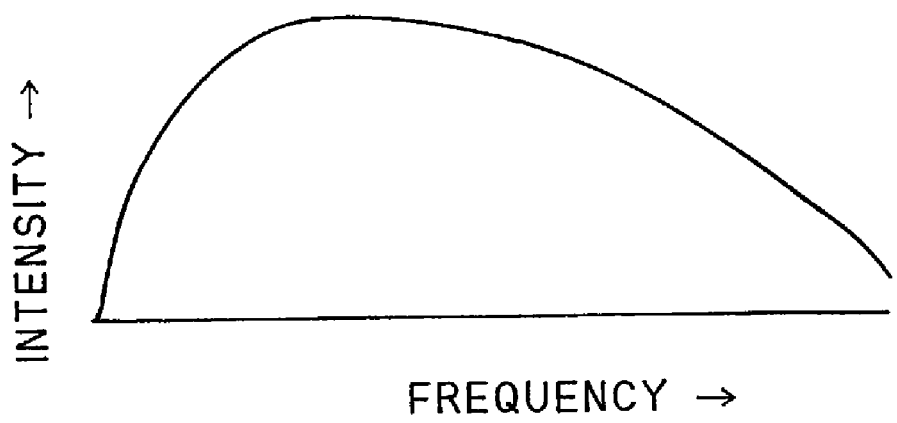
Figure 14C:
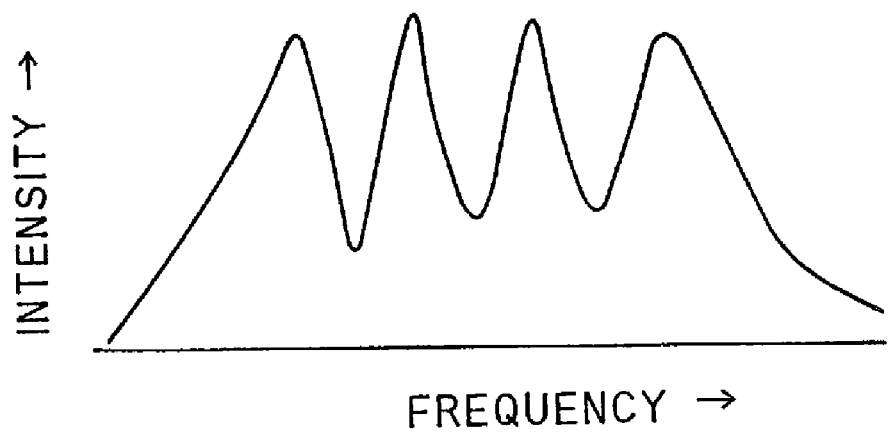

Referring now to FIGS. 14A through 14C, the mechanism of distinguishing the wireless tags TGR from one another in the wireless communication system in accordance with the second modification of the first and second embodiments is described in detail.

As shown in FIG. 14A, the load impedance characteristics of each wireless tag TGR exhibit the maximum values at the resonant frequencies of the respective resonance circuits 75 through 78. In each wireless tag TGR having the resonance circuits 75 through 78, response signals that are generated after pulse signals received by the resonance circuits 75 through 78 are reflected have the same polarities as the received pulse signals at such a frequency that the load impedance is higher than the characteristic impedance of the transmission path 2, as in the case of an open circuit in each wireless tag TGn of the first embodiment. Meanwhile, at such a frequency that the load impedance is lower than the characteristic impedance of the transmission path 2, the response signals having the opposite polarities from the received pulse signals are transmitted through the wideband antennas 1, as in the case of a short-circuit in each wireless tag TGn of the first embodiment.

Accordingly, when such a response signal is received by an interrogator PCC and is superimposed with a template signal Stp having a high signal intensity over a wide frequency band as shown in FIG. 14B, the response signal Sin and the template signal Stp cancel each other if the response signal Sin has frequency components of the opposite polarity from the pulse signal. As a result, the frequency characteristics of each response signal can be read through a FFT operation, as shown in FIG. 14C. Since the waveform shown in FIG. 14C exhibits the same intensity distribution as the waveform shown in FIG. 14A, the interrogator PCC can distinguish each one wireless tag TGR from another.

In the above described second modification of the first and second embodiments, each wireless tag TGR has the resonance circuits 75 through 78 that can be resonated at several resonant frequencies. Accordingly, multi-bit response signals can be generated with the use of resonance circuits each having a relatively low Q value.

Also, since each wireless tag TGR is identified based on the results of frequency analysis through the sampling of each response signal from the wireless tag TGR received by the wideband antenna 18, the identifying the wireless tag TGR can be performed, and the distance to the wireless tag TG can be detected, without the use of carrier waves. Thus, the system can be made smaller in size, and the power consumption can be reduced.

Furthermore, since the superimposed signal Sm obtained by superimposing the response signal Sin with the template signal Stp is subjected to sampling for frequency analysis, each wireless tag TGR can be accurately identified with a simple structure.

Moreover, the template signal Stp is generated based on the clock signal Sc1 generated in advance. Accordingly, the same template signal Stp is used for each response signal Sin, so as to identify each wireless tag TGR.

In addition to the above described modifications of the first and second embodiments, the following structure may be employed, for example. The length $L_0$ of the transmission path 2 needs to be set so as to effectively separate the pulse waves from one another in relation to the communication range. Therefore, a delay line may be used to set the length $L_0$ of the transmission path 2 effectively long. In such a case, each response signal needs to be received when unnecessary reflection from a short distance with respect to the interrogator PCn is eliminated.

The electric power is supplied from a narrow-band antenna to the wireless tag TGn in FIG. 6. However, the present invention is not limited thereto, and for example, a solar cell may be used for supplying power to each wireless tag TGn.

Figure 15:
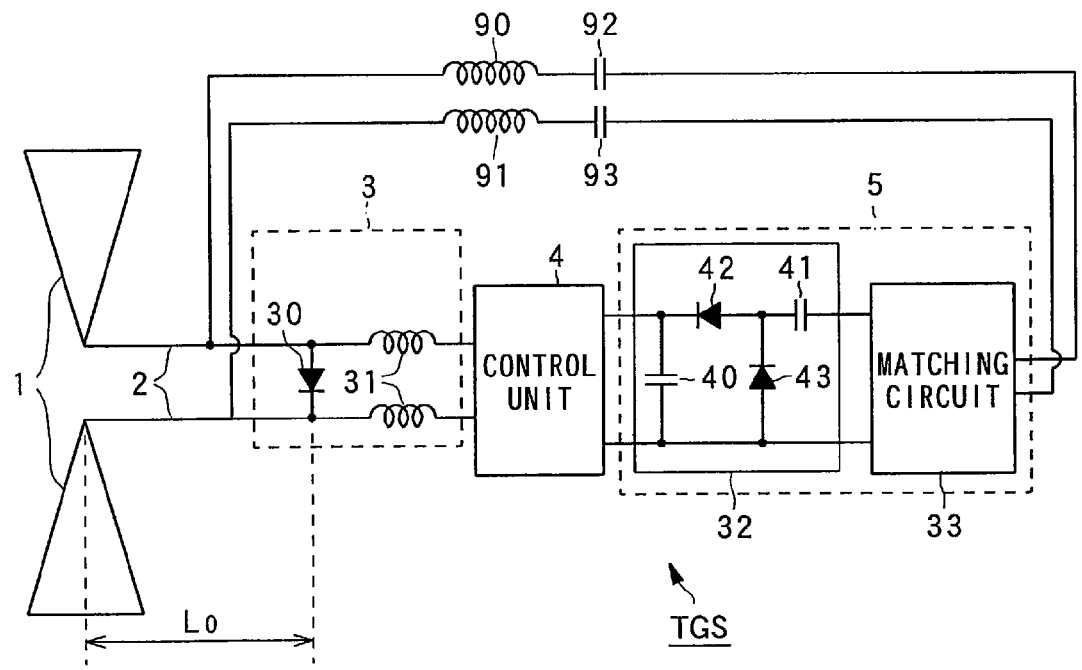
FIG. 15 is a diagram illustrating a detailed structure in accordance with a further modification of a wireless tag.

FIG. 15 illustrates a wireless tag TGS that has a series resonance circuit in which inductance elements 90 and 91 and capacitors 92 and 93 are connected in series. In FIG. 15, the same components as those of the wireless tag TG shown in FIG. 6 are denoted by the same reference numerals as those in FIG. 6, and explanation of them is not described herein. In this wireless tag TGS, only signals of a predetermined frequency are input from the wideband antennas 1 to the matching circuit 33 through the series resonance circuit, so as to supply power.

In this structure, the narrow-band antenna 6 shown in FIG. 6 is unnecessary. Thus, the structure is simplified and made smaller in size.

(IV) Third Embodiment

Referring now to FIGS. 16 through 20C, a third embodiment of the present invention is described.

Figure 16:
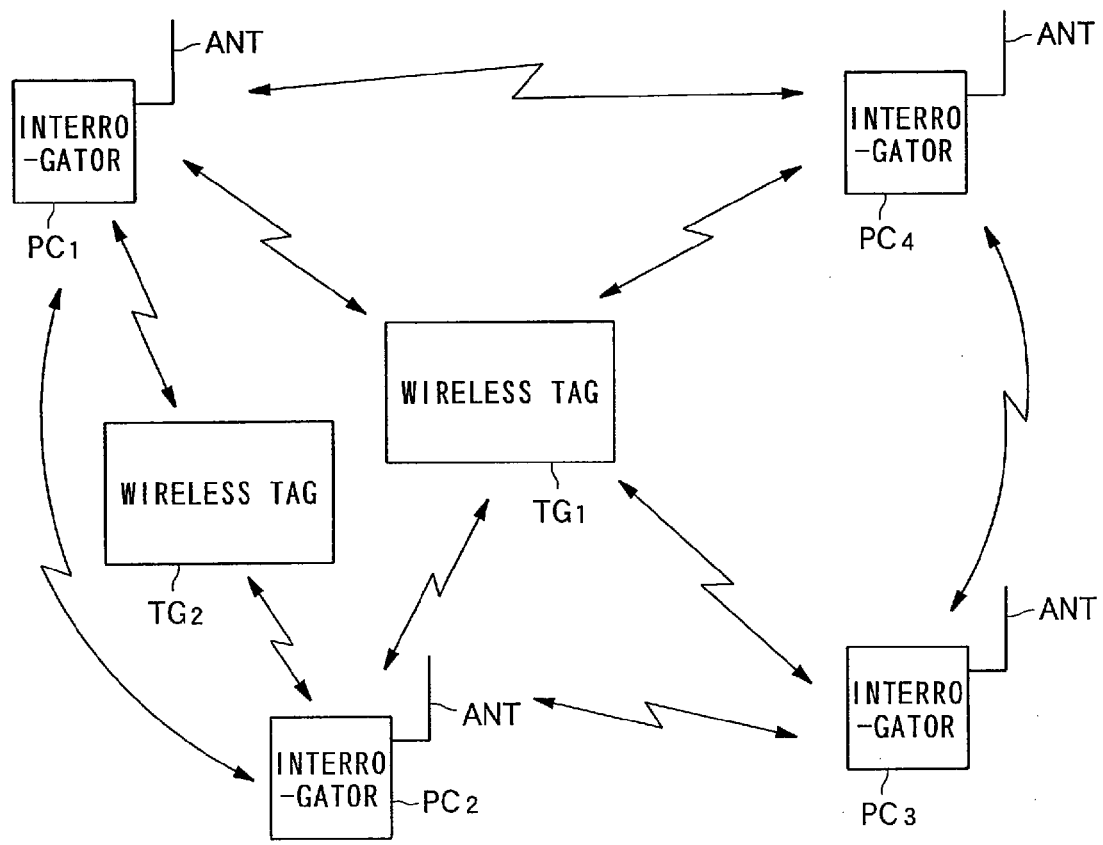
FIG. 16 is a block diagram schematically illustrating the structure of a wireless communication system in accordance with a third embodiment of the present invention.
Figure 17:
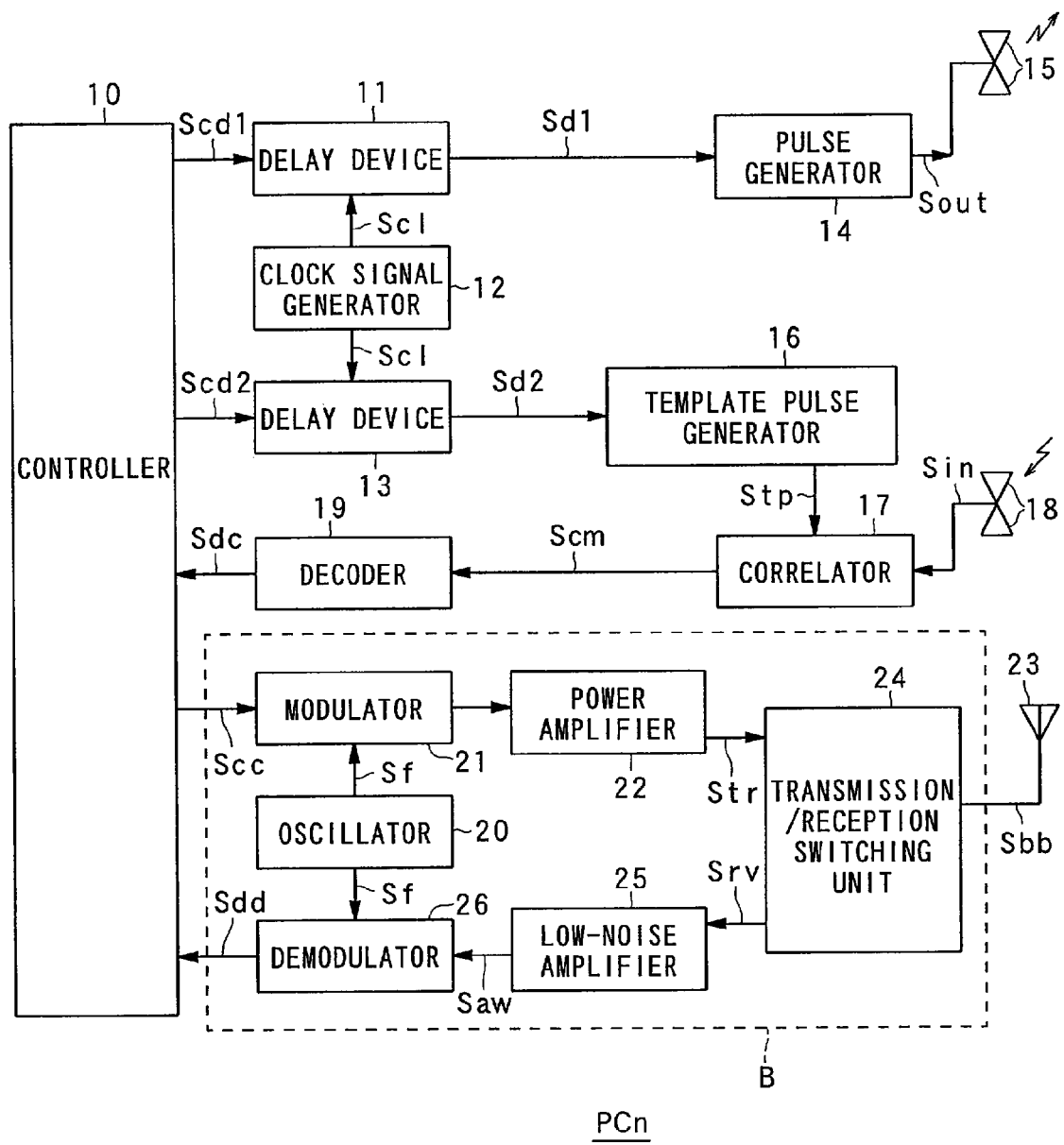
FIG. 17 is a block diagram schematically illustrating the structure of an interrogator in accordance with the third embodiment.

First, the entire structure and the operation of a wireless communication system in accordance with the third embodiment are described, with reference to FIGS. 16 and 17. FIG. 16 is a block diagram schematically showing the structure of the wireless communication system in accordance with the third embodiment. FIG. 17 is a block diagram schematically showing the structure of an interrogator in accordance with the third embodiment.

In the structure and operation of the wireless communication system in accordance with the third embodiment, the same components and aspects as those of the structure and operation of the wireless communication system of the first or second embodiment are denoted by the same reference numerals as those in the first and second embodiments, and explanation of them is not described herein.

Referring first to FIG. 16, the entire structure of the wireless communication system in accordance with the third embodiment is described.

As shown in FIG. 16, the wireless communication system SS in accordance with the third embodiment includes interrogators PC1, PC2, PC3, . . . , PCn (n being a natural number, as will be the same hereinafter) and wireless tags TG1, TG2, . . . , TGn as responders that are attached to commercial products to be subjected to distance measurement.

In this structure, each interrogator PCn transmits a pulse signal in compliance with the UWB method to each wireless tag TGn. Here, the pulse signal is transmitted from a wideband antenna (described later) of the interrogator PCn, and is received by wideband antennas (described later) of each wireless tag TGn.

The pulse signal received by each wireless tag TGn is reflected by a load impedance unit (described later) of each wireless tag TGn, and is then transmitted (or returned) as a response signal (the response signal corresponding to the received pulse signal) from the wideband antennas of each wireless tag TGn to each interrogator PCn.

Each interrogator PCn then receives the response signal through a wideband antenna, and detects the content of the response signal. Based on the content of the response signal, each interrogator PCn distinguishes each one wireless tag TGn from another. Each interrogator PCn also detects the period elapsing between the time when the pulse signal is transmitted from the interrogator PCn to each wireless tag TGn and the time when the corresponding signal is received by the interrogator PCn. Based on the detected period of time, the interrogator PCn detects the direct distance between the interrogator PCn and each wireless tag TGn.

In each wireless tag TGn, a control unit described later) performs such a control operation that the load impedance of the load impedance unit varies among the wireless tags TGn (or the time-varying element of the load impedance varies among the wireless tags TGn). As the load impedances of the wireless tags TGn differ from one another, the timings of the pulse waves contained in the response signals from the wireless tags TGn also differ from one another. As a result, each interrogator PCn can distinguish each one wireless tag TGn from another.

Each interrogator PCn of this embodiment transmits pulse signals of more than one bit, also in compliance with the UWB method, to other interrogators PCm (m being a natural number, n≠m; hereinafter, an "interrogator" and "other interrogators" will be distinguished from each other, referred to as an "interrogator PCn" and "other interrogators PCm"). Here, the pulse signals are transmitted from the wideband transmission antenna provided in each interrogator PCn, and are received by the wideband reception antenna provided in each of the other interrogators PCm.

Based on the pulse signals received by each of the other interrogators PCm, pulse signals of more than one bit are transmitted (or returned), in compliance with the UWB method, from the wideband transmission antenna of the other interrogator PCm to the interrogator PCn.

Each interrogator PCn receives the returned pulse signal through a wideband antenna, and detects the content of the return pulse signal. Based on the content of the return pulse signal, each interrogator PCn identifies each of the other interrogators PCm. Based on the state of the pulse waves contained in the received pulse signal, the distance to each of the other interrogators PCm can be detected.

Each of the other interrogators PCm detects the period elapsing between the time when the pulse signal from the interrogator PCn is received and the time when the return pulse signal is transmitted to the interrogator PCn. The time information is added to the return pulse signal, which is then transmitted to the interrogator PCn. The interrogator PCn detects the period elapsing between the time when the pulse signal is transmitted to the other interrogator PCm and the time when the return pulse signal together with the time information is returned from the other interrogator PCm. The period of time specified in the time information is subtracted from the detected time, so as to determine the period of time required for the pulse signal or the return pulse signal to be transmitted through the space between the interrogator PCn and the interrogator PCm. Based on the determined time, the interrogator PCn detects the direct distance between the interrogator PCn and the interrogator PCm.

Pulse signals of two or more bits are used in the recognition and the distance detection among the interrogators PCn, because pulse signals to be transmitted and received for device recognition need be distinguished from pulse signals to be transmitted and received for distance detection, since the simple reflecting function by virtue of the transmission path and the load of each wireless tag TGn is not used in wireless communication in compliance with the UWB method among the interrogators PCn.

The structure of each wireless tag TGn in accordance with the third embodiment is substantially the same as the structure of each wireless tag TGn in accordance with the first embodiment illustrated in FIG. 2, and therefore, explanation of the components of each wireless tag TGn is not described herein.

Referring now to FIG. 17, the structure of each interrogator PCn in accordance with the third embodiment is described in detail.

As shown in FIG. 17, each interrogator PCn in accordance with the third embodiment includes: a controller 10 as the first distance detecting means, the second distance detecting means, the device position detecting unit, the responder identifying means, the third distance detecting means, the determining means, the reporting unit, and the interrogator number detecting unit; delay devices 11 and 13; a clock signal generator 12; a pulse generator 14; a wideband antenna 15 (for transmitting pulse signals) having the same structure as each of the wideband antennas 1 of each wireless tag TGn; a template pulse generator 16; a correlator 17; a wideband antenna 18 (for receiving response signals from the wireless tags TGn) having the same structure as the wideband antenna 15; a decoder 19; an oscillator 20; a modulator 21; a power amplifier 22; a narrow-band antenna 23 having the same structure as the narrow-band antenna 6 of each wireless tag TGn, for example; a transmission/reception switching unit 24; a low-noise amplifier 25; and a demodulator 26. Here, the oscillator 20, the modulator 21, the amplifier 22, the narrow-band antenna 23, the transmission/reception switching unit 24, the low-noise amplifier 25, and the demodulator 26 constitute a power supply unit B that transmits radio waves formed with continuous waves to the narrow-band antenna 6 of each wireless tag TGn. The power supply unit B of each interrogator PCn of this embodiment has the function of exchanging information with the other interrogators PCm (exchanges of information in compliance with the wireless LAN (Local Area Network) standards, for example, unlike the later described information exchange involving pulse signals), as well as the function of supplying electric power to the wireless tags TGn.

Next, the communication operation of each interrogator PCn with each wireless tag TGn is described.

When the pulse signal is transmitted to the wireless tags TGn, the clock signal generator 12 generates a clock signal Sc1 of a predetermined constant frequency, and outputs the clock signal Sc1 to the delay devices 11 and 13.

Based on a control signal Scd1 supplied from the controller 10, the delay device 11 delays the clock signal Sc1, and outputs a delayed clock signal Sd1 to the pulse generator 14. Here, the delay amount for the clock signal Sc1 delayed by the delay device 11 is randomly determined by a pseudo random code for each pulse signal. The pseudo random code may be of the so-called M (Maximum-length) sequences or the Gold sequences, for example.

Based on the delayed clock signal Sd1, the pulse generator 14 then generates a pulse signal Sout through a pulse generating operation in compliance with the UWB method, and transmits the pulse signal Sout to the wireless tags TGn via the wideband antenna 15.

Meanwhile, the response signal from each wireless tag TGn is received by the wideband antenna 18, and is output as the response signal Sin to the correlator 17.

At this point, the clock signal generator 12 outputs the clock signal Sc1 to the delay device 13. Based on a control signal Scd2 supplied from the controller 10, the delay device 13 delays the clock signal Sc1, and outputs a delayed clock signal Sd2 to the template pulse generator 16. The delay amount in the delay device 11 is different from the delay device in the delay device 13.

Using the delayed clock signal Sd2, the template pulse generator 16 generates a template signal Stp to be used for analyzing the content of the received response signal Sin, and outputs the template signal Stp to the correlator 17.

The correlator 17 compares the phase of the received response signal Sin with the phase of the template signal Stp. The correlator 17 then generates a correlation signal Scm indicating the degree of correlation (similarity) between the signals, and outputs the correlation signal Scm to the decoder 19.

Based on the correlation signal Scm, the decoder 19 reads and decodes the content of the response signal Sin, and outputs a decoded signal Sdc to the controller 10.

Based on the decoded signal Sdc, the controller 10 distinguishes the wireless tag TGn that has transmitted the received response signal Sin from the other wireless tags TGn in the later described manner. The controller 10 also determines the distance between the wireless tag TGn that has transmitted the response signal Sin and the interrogator PCn that has received the response signal Sin in the later described manner.

When power is supplied from an interrogator PCn to each wireless tag TGn, the oscillator 20 of the power supply unit B generates an oscillation signal Sf indicating the predetermined frequency of the continuous waves, and outputs the oscillation signal Sf to the modulator 21.

Based on a control signal Scc supplied from the controller 10, the modulator 21 performs a predetermined modulating operation for the oscillation signal Sf (more specifically, an amplitude modulating operation in accordance with the content of identification number information or the like as to each wireless tag TGn in a case where the continuous waves are transmitted as carrier waves). The modulator 21 then outputs a modulated signal Se to the power amplifier 22.

The power amplifier 22 in turn performs a predetermined amplifying operation for the modulated signal Se, and outputs a transmitted signal Str to the transmission/reception switching unit 24.

The transmission/reception switching unit 24 then transmits the transmitted signal Str as the electric signal Sbb, in predetermined transmission timing, to the narrow-band antenna 6 of each wireless tag TGn via the narrow-band antenna 23.

In a case where an information exchange with any other interrogator PCm involving continuous waves is carried out with the power supply unit B, the oscillation signal Sf from the oscillator 20 is output to the demodulator 26 as well as the power amplifier 22.

By virtue of the functions of the modulator 21, the power amplifier 22, the transmission/reception switching unit 24, and the narrow-band antenna 23, a continuous wave signal carrying the information to be sent is transmitted to the other interrogator PCm as the transmission destination in the same manner as in the case of supplying power to each wireless tag TGn.

The continuous wave signal returned from the other interrogator PCm is received by the narrow-band antenna 23, and is transmitted as a received signal Srv from the transmission/reception switching unit 24 to the low-noise amplifier 25 in predetermined reception timing. The low-noise amplifier 25 amplifies the received signal Srv at a predetermined amplification rate, and outputs an amplified received signal Saw to the demodulator 26.

Using the oscillation signal Sf, the demodulator 26 detects the contents of the amplified received signal Saw. The demodulator 26 then generates a detection signal Sdd indicating the detected content, and outputs the detection signal Sdd to the controller 10.

Based on the content of the detection signal Sdd, the controller 10 recognizes the content of the received signal Srv.

The waveforms of the pulse signal and the response signal to be transmitted and received between each interrogator PCn and each wireless tag TGn of the third embodiment are the same as the waveforms of the pulse signal and the response signal to be transmitted and received between each interrogator PCn and each wireless tag TGn of the first embodiment shown in FIG. 4A, and therefore, explanation of them is not described herein.

Also, the reading of the content of the response signal to be performed mainly by the correlator 17 after the reception of the response signal from a wireless tag TGn is the same as the reading of the content of the response signal to be performed mainly by the correlator 17 after the response signal is received from a wireless tag TGn in the first embodiment illustrated in FIG. 4B. Therefore, explanation of the operation is not described herein.

Further, the mechanism of distinguishing the wireless tags TGn from one another in the wireless communication system SS of the third embodiment is the same as the mechanism of distinguishing the wireless tags TGn from one another in the wireless communication system S of the first embodiment illustrated in FIGS. 5A and 5B. Therefore, explanation of the mechanism is not described herein. The structure of each wireless tag TGn in accordance with the third embodiment is also first embodiment illustrated in FIG. 6, and therefore, explanation of it is not described herein. The timings of switching the switching element and transmitting a pulse signal from an interrogator PCn in accordance with the third embodiment are also the same as the timings of switching the switching element and transmitting a pulse signal from an interrogator PCn in accordance with the first embodiment illustrated in FIG. 7. Therefore, explanation of them is not described herein. The relationship between the pulse signal transmission from the wideband antenna 15 and the electric signal transmission from the narrow-band antenna 23 in each interrogator PCn in accordance with the third embodiment is also the same as the relationship between the pulse signal transmission from the wideband antenna 15 and the electric signal transmission from the narrow-band antenna 23 in each interrogator PCn in accordance with the first embodiment illustrated in FIG. 8. Therefore, explanation of it is not described herein.

Position Detecting Operation in Accordance with Third Embodiment

Figure 18:
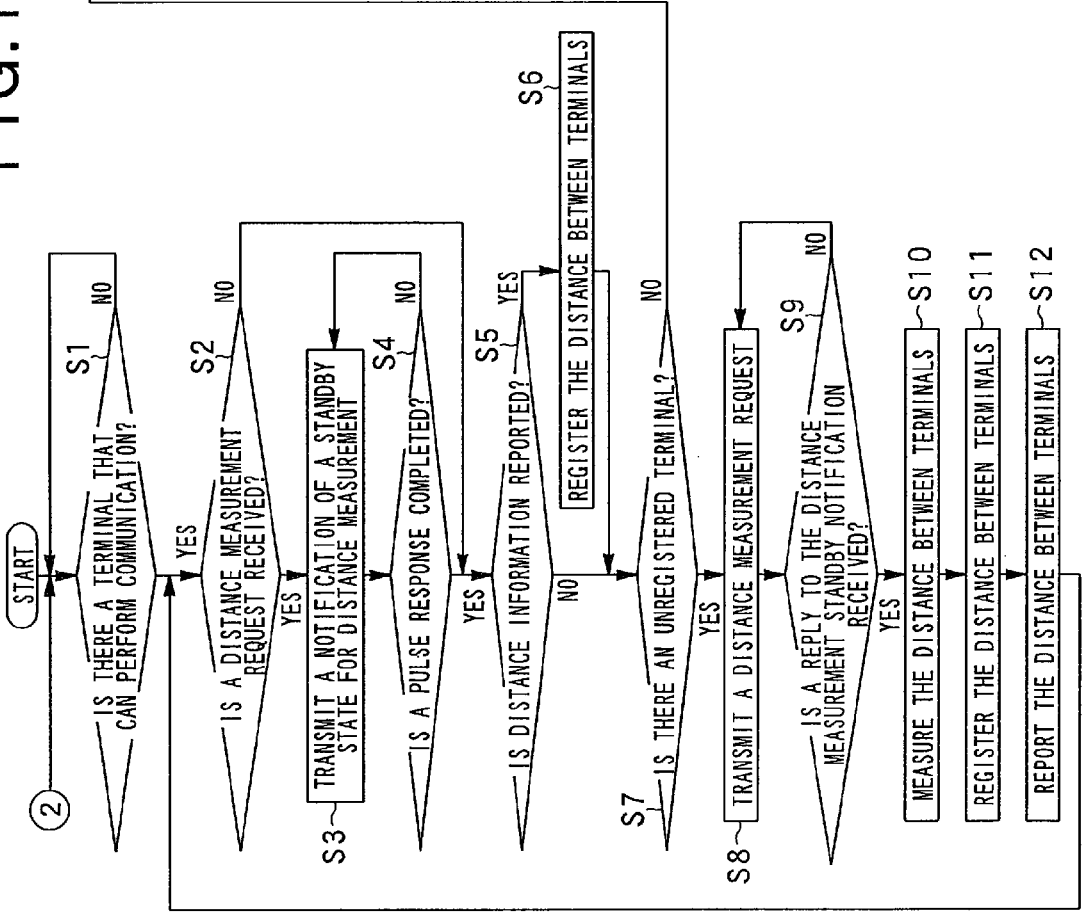
FIG. 18 is a flowchart of a position detecting process in accordance with the third embodiment.
Figure 19:
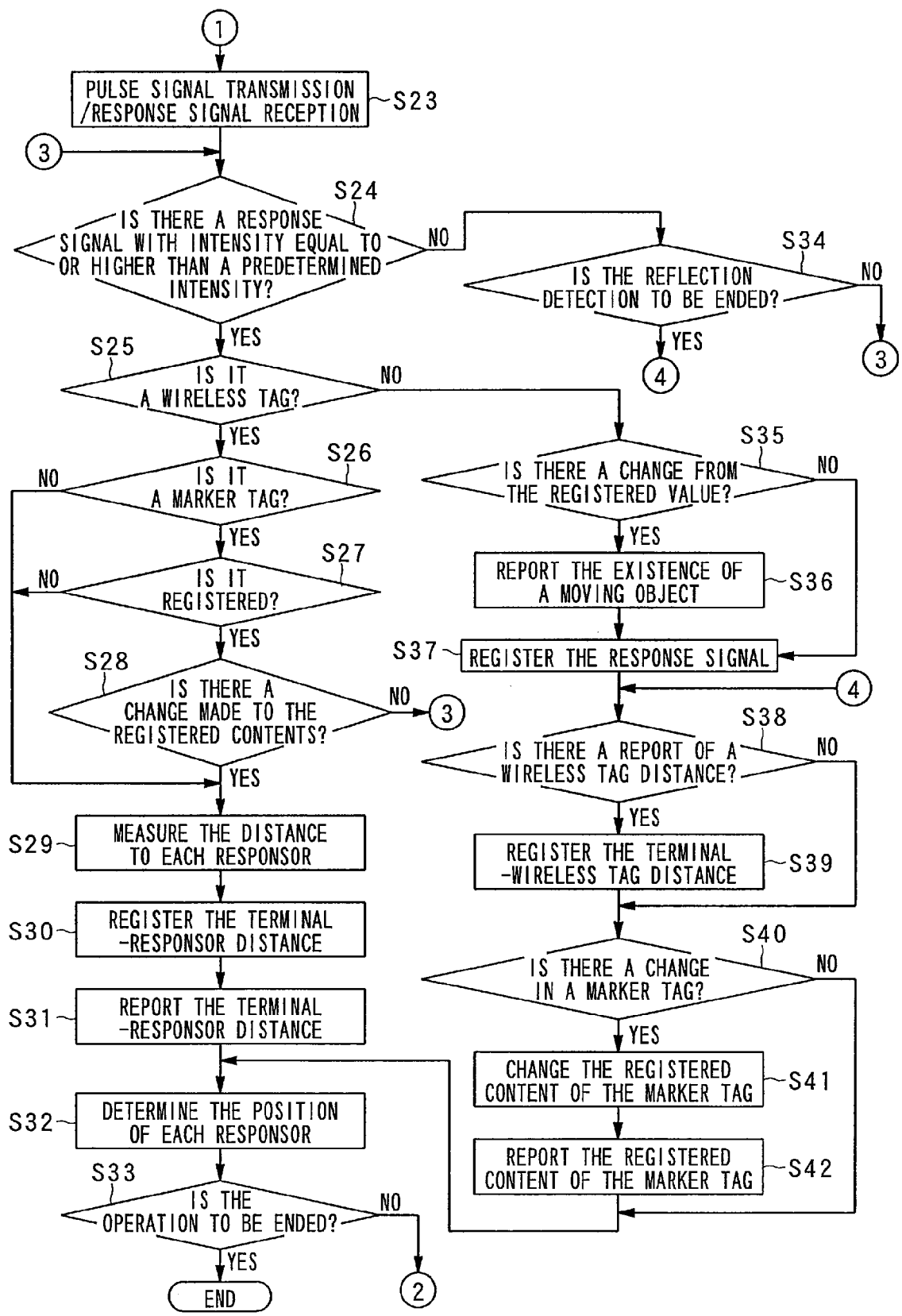
FIG. 19 is a flowchart of the position detecting process in accordance with the third embodiment.
Figure 20A:
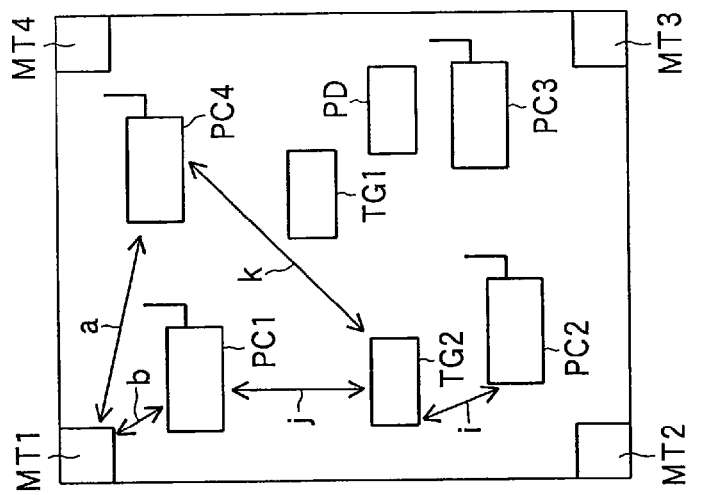
FIGS. 20A to 20C illustrate the position detecting process in accordance with the third embodiment, where
Figure 20B:
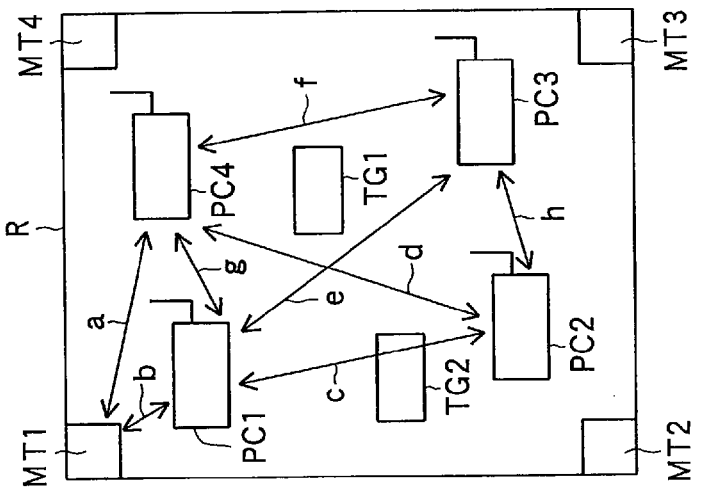
Figure 20C:
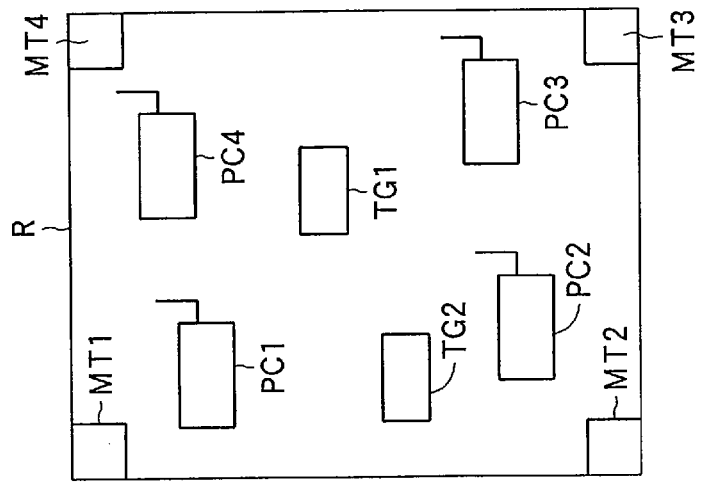

Referring now to FIGS. 18 through 20C, a position detecting operation to be performed in the wireless communication system SS that has the above described structure and performs the above described operation in accordance with the third embodiment is described. FIGS. 18 and 19 show a flowchart of the position detecting operation in accordance with the third embodiment. FIGS. 20A through 20C schematically show the procedures in the position detecting operation in accordance with the third embodiment.

Prior to the start of the position detecting operation in accordance with the third embodiment, the interrogators PC1 through PC4 and the wireless tags TG1 and TG2 having the above described structures need to be in one room R, as shown in FIG. 20A. In the room R, the positions of the respective components are predetermined, and marker tags MT1 through MT4 are provided at the four corners of the room R. The marker tags MT1 through MT4 serve as special responders, as the position information indicating the positions of the marker tags MT1 through MT4 is input and set beforehand in the each of the interrogators PC1 through PC4.

In FIGS. 18 and 19, a "terminal" means one of the interrogators PCn, and a "responder" means one of the wireless tags TGn. FIGS. 18 and 19 are a flowchart of the position detecting operation of this embodiment to be performed for one interrogator PCn (the interrogator PC1 in the following description).

As shown in FIG. 18, in the case where the position detecting operation in accordance with this embodiment is performed for the interrogator PC1, checking is first performed to determine whether there is any other interrogator PCm that can perform wireless communication in compliance with the UWB method after the power is on (Step S1). More specifically, the procedure of Step S1 is carried out by determining whether a return pulse signal is returned in response to a pulse signal transmitted for distance detection.

If there is not a response to the pulse signal ("NO" in Step S1), the position detection operation in accordance with this embodiment cannot be performed. Therefore, the procedure of Step S1 is repeated until another interrogator PCm that can perform wireless communication is found. If there is a response to the pulse signal and there is another interrogator PCm that can perform wireless communication ("YES" in Step S1), checking is performed to determine whether a pulse signal for distance detection is transmitted from the other interrogator PCm (Step S2), before the interrogator PC1 detects the distance to the other interrogator PCm that can perform wireless communication. If a pulse signal for distance detection is not transmitted from the other interrogator PCm ("NO" in Step S2), the operation moves on to Step S5. If a pulse signal for distance detection is transmitted from the other interrogator PCm ("YES" in Step S2), a notification that the interrogator PC1 is in a standby state for responding to a pulse signal from the other interrogator PCm is transmitted to the other interrogator PCm (Step S3).

In response to the notification of the standby state, a pulse signal for distance detection is transmitted from the other interrogator PCm, and checking is performed to determine whether a pulse signal for distance detection in response to the pulse signal from the other interrogator PCm has been returned from the interrogator PC1 (Step S4). If the response is not yet complete ("NO" in Step S4), the procedure of Step S3 is repeated until the response is complete. If the transmission of the pulse signal as the response is completed ("YES" in Step S4), checking is performed to determine whether the distance information indicating the distance to the interrogator PC1 detected by the other interrogator PCm using the pulse signal as the response is transmitted as a pulse signal from the other interrogator PCm (Step S5).

If the detected distance information is transmitted ("YES" in Step S5), the distance indicated by the transmitted distance information is registered as the distance to the other interrogator PCm, the distance between other interrogators PCm, or the distance between the other interrogator PCm and a wireless tag TGn detected by some other interrogator PCm, in the controller 10 of the interrogator PC1 (Step S6). The operation then moves on to Step S7.

If the distance information is not transmitted from the other interrogator PCm ("NO" in Step S5), the distances between the interrogator PC1 and all the other interrogators PCm might have already been detected (in such a case, any distance is not detected again, and the distance information is not transmitted). Therefore, checking is performed to determine whether there is any other interrogator PCm not having its distance from the interrogator PC1 detected and registered in the interrogator PC1 (Step S7). If there is any other interrogator PCm having its distance unregistered ("YES" in Step S7), a pulse signal for requesting distance detection is transmitted from the interrogator PC1 (Step S8). Checking is then performed to determine whether a pulse signal indicating the standby state for distance detection (see Step S3) is returned, in response to the transmitted pulse signal, from the other interrogator PCn (the other interrogator not having its distance registered) (Step S9).

If the pulse signal indicating the standby state is not transmitted ("NO" in Step S9), the procedure of Step S8 is repeated. If the pulse signal indicating the standby state is transmitted ("YES" in Step S9), a pulse signal for distance detection is transmitted to the other interrogator PCm that has transmitted the pulse signal indicating the standby state, and a return pulse signal is received. Based on the return pulse signal, the distance to the other interrogator PCm is detected (Step S10). The detected distance is registered in as the distance between the interrogator PC1 and the other interrogator PCm in the controller 10 of the interrogator PC1 (Step S1). The distance information indicating the registered distance is then returned to the other interrogator PCm (Step S12), and the distance information is also transmitted to other interrogators PCm existing within the communication range. Here, the distance detection between the interrogator PC1 and the other interrogator PCm is completed, and the operation returns to Step S2, to detect the distance to a next interrogator PCn. In the procedure of Step S12, the distance reported by the other interrogator PCm is also transmitted. After that, the procedures of Step S S2 through S12 are repeated until there is not an interrogator PCn having its distance unregistered ("NO" in Step S7).

If there is not any other interrogator PCm having its distance unregistered ("NO" in Step S7), checking is performed to determine whether there is an interrogator PCn that no longer functions as an interrogator PCn because its power supply switch has been turned off or the like (such an interrogator PCn being referred to as "finished terminal" in FIG. 18) among the other interrogators PCm each having its distance registered (Step S13). In this checking procedure, an interrogator PCn that does not respond to a pulse signal containing information is considered to be a finished terminal.

If there is not any other interrogator PCm regarded as a finished terminal ("NO" in Step S13), the operation moves on to Step S15. If there is any other interrogator PCm regarded as a finished terminal ("YES" in Step S13), the distance between the interrogator PCn as a finished terminal and the interrogator PC1 is deleted in the interrogator PC1 (Step S14). Checking is then performed to determine whether the number of interrogators PCn of this embodiment (referred to as "semi-fixed terminals" in FIG. 18) is equal to or larger than the required number (three, to be specific) for detecting the position of each wireless tag TGn (Step S15). If the number of interrogators PCn is large enough ("YES" in Step S15), the operation moves on to Step S23. If the number of semi-fixed interrogators PCn is not large enough ("NO" in Step S15), checking is performed to determine whether a mobile terminal having a function as an interrogator exists in the room R to perform the position detecting operation (Step S16). If there is not a mobile terminal ("NO" in Step S16), the operation returns to Step S2, and the above described procedures are repeated. If there is a mobile terminal ("YES" in Step S16), a pulse signal for requesting distance detection is transmitted from the interrogator PC1 to the mobile terminal (Step S17). Checking is then performed to determine whether a pulse signal indicating the standby state for distance detection (see Step S3) is transmitted from the mobile terminal in response to the transmitted pulse signal (Step S18).

If the pulse signal indicating the standby state is not transmitted ("NO" in Step S18), the procedure of Step S17 is repeated. If the pulse signal indicating the standby state is transmitted ("YES" in Step S18), a pulse signal for distance detection is transmitted to the mobile terminal that has transmitted the pulse signal indicating the standby state. A return pulse signal is then received, and, based on the return pulse signal, the distance to the mobile terminal is detected (Step S19). The detected distance is registered as the distance between the interrogator PC1 and the mobile terminal in the controller 10 of the interrogator PC1 (Step S20). The distance information indicating the registered distance is returned to the mobile terminal, and is also transmitted to the other interrogators PCm (Step S21). Here, the detection of the distance to the mobile terminal is completed.

Checking is then performed to determine whether the number of interrogators PCn including the mobile terminal is equal to or larger than the required number (three, to be specific) for detecting the location of each wireless tag TGn (Step S22). If the number of interrogators PCn is large enough ("YES" in Step S22), the operation moves on to Step S23. If the number of interrogators PCn is not large enough ("NO" in Step S22), the operation returns to Step S2, to repeat the above described procedures.

After the above described procedures are completed, the distance between each two interrogators PCn (the distances being denoted by "c" through "h" in FIG. 20B) is detected and registered in each interrogator PCn.

Next, the operation moves on to the procedures for detecting the distances from the wireless tags TG1 and TG2.

If the number of interrogators PCn and the likes is large enough for specifying the position of each of the wireless tags TG1 and TG2 ("YES" in Step S15 or "YES" in Step S22), a pulse signal as an interrogating pulse for position detection is transmitted from each interrogator PCn, and a corresponding response signal is received (Step S23).

Checking is performed to determine whether the intensity of the response signal is equal to or higher than predetermined intensity (Step S24). If there is not a wireless tag TGn that has transmitted a response signal with intensity equal to or higher than the predetermined intensity or there is not a reflected matter (Step S24), checking is performed on the interrogator PC1 to determine whether the detection of response signals from the wireless tags TGn is to be ended as the end of the position detecting operation of one cycle (Step S34). If the detection is to be ended, the operation moves on to Step S38.

If the detection of response signals is not to be ended ("YES" in Step S34), the operation returns to Step S24.

Meanwhile, if there is a wireless tag TGn that has transmitted a response signal with intensity equal to or higher than the predetermined intensity or there is another reflected matter ("YES" in Step S24), checking is performed to determine whether it is a wireless tag TGn or it is a pulse signal reflected by another wireless tag TGn (Step S25). If it is a wireless tag TGn ("YES" in Step S25), checking is performed to determine whether it is one of the marker tags MTn (Step S26).

If it is not a marker tag MTn ("NO" in Step S26), the operation moves on to Step S29 to detect the distance to the wireless tag TGn (Step S29). If it is a marker tag MTn ("YES" in Step S26), checking is performed to determine whether the marker tag MTn has already been registered in the interrogator PC1 (Step S27). If the marker tag MTn has not been registered ("NO" in Step S27), the operation moves on to Step S29. If the marker tag MTn has already been registered ("YES" in Step S27), checking is performed to determine whether there is a change made to the registered content, based on the response signal and data that is input beforehand during the later described procedure of Step S41 (Step S28). If there is not a change made to the registered content ("NO" in Step S28), the operation returns to Step S24, to repeat the above described procedures.

If there is a change made to the registered content ("YES" in Step S28), the distance to the marker tag MTn about which the change is made to the registered content is detected in accordance with the above described principles (Step S29). The distance detected in Step S29 is registered in the controller 10 of the interrogator PC1 (Step S30), and the detected distance to the interrogator PC1 is also reported to the other interrogators PCm (Step S31). Here, if the distance between any other interrogator PCm and a wireless tag TGn is reported from the other interrogator PCm during the later described procedure of Step S38, the information is also reported (transmitted) to the other interrogators PCm.

The distance between the other interrogator PCm and each wireless tag TGn or each marker tag MTn reported by each of the other interrogators PCn is registered in the interrogator PC1, so that the interrogator PC1 determines the position of each wireless tag TGn in the room R (Step S32). Checking is then performed to determine whether the interrogator PC1 performs an operation to end the detection of the positions of the wireless tags TGn (Step S33). If such an operation is performed ("YES" in Step S33), the position detecting operation of this embodiment is ended immediately. If such an operation is not performed ("NO" in Step S33), the operation returns to Step S1, to repeat the above described procedures.

Meanwhile, if the component that has transmitted the response signal is not a wireless tag TGn because the identification information indicating a wireless tag TGn is not received or the like ("NO" in Step S25), checking is performed to determine whether the content of the response signal (or the distance detected from the response signal) indicates a change in the already detected distance to the transmitter of the response signal (Step S35). If there is not a change ("NO" in Step S35), the operation moves on to Step S37. If there is a change ("YES" in Step S35), the transmitter is determined to be an unknown moving body, and a notification to that effect is sent to the interrogator PC1 (Step S36).

The contents of response signals from the other wireless tags TGn, except the object reported to be a moving body, is registered in the controller 10 of the interrogator PC1 (Step S37). Checking is then performed to determine whether the distances to the wireless tags TGn detected by any other interrogator PCm are reported from the other interrogator PCm (Step S38). If the distances are not reported ("NO" in Step S38), the operation moves on to Step S40. If the distances are reported ("YES" in Step S38), the reported distances are registered as the distances between the other interrogator PCm and the respective wireless tags TGn in the interrogator PC1 (Step S39).

Based on the registered contents or the contents input to the interrogator PC1, checking is performed to determine whether a change is made to the registered content with respect to each marker tag MTn (Step S40). If there is not a change ("NO" in Step S40), the operation moves on to Step S32. If there is a change ("YES" in Step S40), a change in accordance with the changed content is made to the registered content (a change in position, new installation, or the like) with respect to each marker tag MTn in the interrogator PC1 (Step S41). The changed registered content is further reported to the other interrogators PCm (Step S42).

After that, the operation moves on to Step S32, to determine the position of each wireless tag TGn in the room R. Here, the position detecting operation of this embodiment comes to an end.

After the above described procedures are completed, the distances between the interrogators PCn and the wireless tags TGn (denoted by "i" through "k" in FIG. 20C) are detected, and the detected distances are registered in each of the interrogators PCn.

Since the distances between the marker tags MTn and the interrogators PCn (denoted by "a" and "b" in FIGS. 20B and 20C) are detected, the absolute positions of the respective wireless tags TGn in the room R are determined. If the marker tags MTn are not employed, the positional relationship between each interrogator PCn and the wireless tags TGn is only relatively determined, and only one of the two positional relationships that are axisymmetrical to each other is determined to be the actual relationship.

As described above, in the operation of the wireless communication system SS of the third embodiment, the distances between the interrogators PCn and the wireless tags TGn, and the positions of the interrogators PCn and the wireless tags TGn are detected through transmission and reception of pulse signals and response signals. Accordingly, distance detection and position detection with respect to the wireless tags TGn and the interrogators PCn can be performed without carrier waves. Thus, while the system is made smaller in size and the power consumption is reduced, the distance detection and the position detection can be performed.

Also, since the wireless tags TGn are distinguished from one another and the detected distance information is transmitted to each interrogator PCn, each interrogator PCn can distinguish one wireless tag TGn from another while detecting the position of each wireless tag TGn.

Furthermore, instead of relative positions with respect to each wireless tag TGn, the absolute position of each wireless tag TGn in the room R is detected, with the positions of the marker tags MTn being the reference positions.

Based on a response signal transmitted from a moving body in the room R, checking is performed to determine whether the moving body is a wireless tag TGn. If the moving body is not a wireless tag TGn, a notification to that effect is sent. In this manner, even in a case where a moving body that is not a wireless tag TGn has entered the room R, the moving body can be distinguished from the wireless tags TGn, and a notification to that effect can be transmitted.

Also, since the distance information is transmitted in the form of pulse waves to each interrogator PCn, the position of each wireless tag TGn can be detected through the distance information without the use of carrier waves, while the system can be made smaller and the power consumption is reduced.

Furthermore, since the number of interrogators PCn existing in the room R is detected, preliminary checking can be performed to determine whether detecting the positions of the wireless tags TGn in the room R can be performed.

Also, a pulse signal from each interrogator PCn is received by the wideband antennas 1, and a response signal obtained by modulating the pulse signal is returned to the interrogator PCn through the wideband antennas 1. Accordingly, distance detection and position detection with respect to the wireless tags TGn and the interrogators PCn can be performed without the use of carrier waves. Thus, while the system can be made smaller and the power consumption is reduced, the distance detection and the position detection can be performed.

In the above described third embodiment, each interrogator PCn detects the position of each of the wireless tags TGn located in the room R. However, the interrogators PCn may be used as terminals, and the information as to the positions of the wireless tags TGn obtained from those terminals may be transmitted to an external device such as a computer located outside the system, so that the computer can detect the positions of the wireless tags TGn in the room R.

Further, the program according to the flowchart shown in FIGS. 18 and 19 may be recorded in an information recording medium such as a flexible disk or a hard disk, or may be obtained through a network such as the Internet. The program may be read and executed by a general-purpose microcomputer that functions as the controller 10 of this embodiment.

As described so far, the present invention can be applied to the field of identification and distance measurement for the wireless tags in wireless communication systems. Particularly, interrogators are provided in a general personal computer, so that the positions of the wireless tags located in the same room as the personal computer can be detected with high precision.

The present invention is not confined to the configuration listed in the foregoing embodiments, but it is easily understood that the person skilled in the art can modify such configurations into various other modes, within the scope of the present invention described in the claims.

The entire disclosures of Japanese Patent Applications No. 2004-076548 filed on Mar. 17, 2004 and Japanese Patent Applications No. 2004-096252 filed on Mar. 29, 2004 including the specification, claims, drawings and summary are incorporated herein by reference in its entirety.

What is claimed is:

1. A responder comprising:
a generating unit configured to generate a response signal, using a pulse signal that is received through a wideband antenna;
a transmitting unit configured to transmit the pulse signal received through the wideband antenna from the wideband antenna to the generating unit and also to transmit the response signal from the generating unit to the wideband antenna, the transmitting unit having a predetermined length; and
the wideband antenna that receives the pulse signal and transmits the response signal,
wherein the length of the transmitting unit is equal to or greater than a half a value obtained by multiplying a velocity at which the received pulse signal and the response signal are transmitted in the transmitting unit by a time equivalent to a pulse width of the received pulse signal.

2. The responder according to claim 1, wherein the transmitting unit located between the wideband antenna and the generating unit has such a length as to transmit the response signal through the wideband antenna in a different transmission manner from any transmission manner of other responders, the other responders each having the same structure as the responder.

3. The responder according to claim 1, wherein the transmitting unit has characteristic impedance that is constant at a predetermined value at a predetermined length.

4. The responder according to claim 1, wherein the generating unit includes a reflection control unit configured to control a pulse reflection coefficient for the received pulse signal.

5. The responder according to claim 1, wherein the generating unit includes a length control unit configured to control an effective length of the transmitting unit, based on a signal state in which the response signal is to be.

6. The responder according to claim 5, wherein the length control unit controls the length to be equivalent to a value obtained by multiplying the velocity at which the pulse signal and the response signal are transmitted in the transmitting unit by a period of time equivalent to the pulse width of the pulse signal, and then adding N/4 (N being 0 or a natural number) of the multiplication result to a half the multiplication result.

7. The responder according to claim 1, further comprising:
a plurality of generating units; and
a plurality of transmitting units configured to transmit the pulse signal received by the wideband antenna to each of the generating unit from the wideband antenna, and also to transmit the response signal from each of the plurality of generating units to the wideband antenna, the transmitting units having different lengths from one another.

8. The responder according to claim 7, further comprising:
a common transmitting unit configured to function as at least a part of each of the plurality of transmitting units.

9. The responder according to claim 1, wherein the generating unit includes a resonating unit that can resonate at a plurality of resonant frequencies.

10. An interrogator that transmits the pulse signal to the responder according to claim 9 and receives the response signal from the responder,
the interrogator comprising:
a generating unit configured to generate the pulse signal;
a wideband antenna configured to transmit the pulse signal to the responder, and to receive the response signal from the responder in response to the pulse signal;
an analyzing unit configured to perform frequency analysis by sampling the received response signal; and
an identifying unit configured to identify the responder, based on a result of the frequency analysis.

11. The interrogator according to claim 10, further comprising:
a superimposing unit configured to superimpose the received response signal with a template signal that is generated in advance, so as to generate a superimposed signal,
the analyzing unit performing frequency analysis by sampling the superimposed signal.

12. The interrogator according to claim 11, wherein the template signal is generated based on a clock signal that is generated in advance.

13. A responder comprising:
a plurality of element responders each being the responder according to claim 1, wherein at least one of the length of the transmitting unit and the load impedance of the transmitting unit and the generating unit seen from the wideband antenna is different in each one of the element responders from another.

14. The responder according to claim 1, further comprising:
a reception antenna configured to receive radio waves; and
a power supply unit configured to convert the received radio waves into electric power, and to supply the electric power to the generating unit.

15. The responder according to claim 14, wherein the radio waves are continuous waves.

16. The responder according to claim 14, wherein:
the reception antenna is a narrow-band antenna that is in tune with a predetermined tuning frequency; and
the radio waves are continuous waves having the tuning frequency.

17. The responder according to claim 14, wherein the wideband antenna also serves as the reception antenna.

18. An interrogator that transmits the pulse signal to the responder according to claim 1 and receives the response signal from the responder,
the interrogator comprising:
a pulse generating unit configured to generate the pulse signal;
a wideband antenna configured to transmit the pulse signal to the responder, and to receive the response signal from the responder in response to the pulse signal; and
an identifying unit configured to identify the responder by comparing the received response signal with a template signal that is generated in advance.

19. The interrogator according to claim 18, wherein:
the pulse generating unit comprises a first modulated clock signal generating unit configured to generate a first modulated clock signal by performing a first modulating operation on a clock signal, the pulse generating unit using the first modulated clock signal to generate and output the pulse signal to the wideband antenna; and
the identifying unit comprises a second modulated clock signal generating unit configured to generate a second modulated clock signal by performing a second modulating operation on the clock signal, the second modulating operation being different from the first modulating operation, the identifying unit using the second modulated clock signal to generate the template signal and to obtain correlations between the response signal and the template signal.

20. The interrogator according to claim 19, wherein the first modulating operation and the second modulating operation are to delay the cock signal based on a pseudo random code.

21. The interrogator according to claim 18, further comprising:
a reflected wave detecting unit configured to detect a reflected wave that is reflected by the wideband antenna of the responder in response to the received pulse signal;
a response wave detecting unit configured to detect a response wave contained in the response signal; and
a response wave interval detecting unit configured to detect a response wave interval that is a period elapsing between the time of receiving the reflected wave and the time of receiving the response wave,
the identifying unit identifying the responder, based on the detected response wave interval.

22. The interrogator according to claim 18, further comprising:
a transmission/reception interval detecting unit configured to detect a transmission/reception interval that is a period elapsing between the time of receiving a reflected wave reflected by the wideband antenna of the responder in response to the received pulse signal and the time of transmitting the pulse signal; and a distance recognizing unit configured to recognize the distance between the interrogator and the responder that transmits the reflected wave, based on the detected transmission/reception interval.

23. The interrogator according to claim 18, further comprising:

a determining unit configured to determine the polarity of the response signal.

24. The interrogator according to claim 18, further comprising:

a radio wave transmitting unit configured to transmit the radio waves to a responder comprising a generating unit configured to generate a response signal, using a pulse signal that is received through a wideband antenna, a transmitting unit configured to transmit the pulse signal received through the wideband antenna from the wideband antenna to the generating unit and also to transmit the response signal from the generating unit to the wideband antenna, the transmitting unit having a predetermined length, and wherein the wideband antenna that receives the pulse signal and transmits the response signal, a reception antenna configured to receive radio waves, and a power supply unit configured to convert the received radio waves into electric power, and to supply the electric power to the generating unit.

25. A wireless communication system comprising:

one or a plurality of the responders according to claim 1;

a plurality of the interrogators, wherein each interrogator comprises a pulse generating unit configured to generate the pulse signal, a wideband antenna configured to transmit the pulse signal to the responder and to receive the response signal from the responder in response to the pulse signal, and an identifying unit configured to identify the responder by comparing the received response signal with a template signal that is generated in advance; and a determining unit configured to determine the position of each of the responders, based on the distance between each of the responders and each of the interrogators, the distance being detected by each of the interrogators.

26. A position detecting system that includes a plurality of interrogators each transmitting a pulse signal as an interrogating wave, and a responder that receives the pulse signal and returns a response signal based on the received pulse signal, the position detecting system comprising:

a first distance detecting unit configured to receive the pulse signal transmitted by each of the interrogators and to detect the distance between each two of the interrogators;

a second distance detecting unit configured to detect the distance between each of the interrogators and the responder, based on the pulse signal and the response signal; and a device position detecting unit configured to detect the position of each of the interrogators and the responder in the position detecting system, based on each of the detected distances.

27. The position detecting system according to claim 26, further comprising:

a plurality of the responders;

a responder identifying unit configured to identify each of the responders, based on the response signal; and a distance information transmitting unit configured to transmit distance information to each of the interrogators, the distance information indicating each of the detected distances.

28. The position detecting system according to claim 27, further including a fixed responder that can be fixed beforehand in a position in the position detecting system, the position detecting system further comprising:

a third distance detecting unit configured to detect the distance between the fixed responder and each of the interrogators, the device position detecting unit detecting the absolute position of each of the interrogators and each of the responders in the position detecting system, based on each of the detected distances.

29. The position detecting system according to claim 26, further comprising:

a receiving unit configured to receive a return signal that is returned from a moving body located in the position detecting system in response to the transmitted pulse signal;

a determining unit configured to determine whether the moving body is the responder, based on the received return signal; and a reporting unit configured to report that the moving body is determined not to be the responder by the determining unit.

30. The position detecting system according to claim 27, wherein the distance information transmitting unit transmits the distance information in the form of pulse waves to each of the interrogators.

31. The position detecting system according to claim 26, further comprising:

an interrogator number detecting unit configured to detect the number of interrogators located in the position detecting system.

32. The responder that is in the position detecting system according to claim 26, comprising:

a wideband antenna configured to receive the transmitted pulse signal and transmits the response signal;

a generating unit configured to modulate the received pulse signal to generate the response signal; and a transmitting unit configured to transmit the received pulse signal to the generating unit through the wideband antenna, and also to transmit the response signal from the generating unit to the wideband antenna.

33. A position detecting method that is utilized in a position detecting system that includes a plurality of interrogators each transmitting a pulse signal as an interrogating wave, and a responder that receives the pulse signal and returns a response signal based on the received pulse signal, the position detecting method comprising:

a first distance detecting step of detecting the distance between each two of the interrogators after receiving the pulse signal transmitted by each of the interrogators;

a second distance detecting step of detecting the distance between each of the interrogators and the responder, based on the pulse signal and the response signal; and a device position detecting step of detecting the position of each of the interrogators and the responder in the position detecting system, based on each of the detected distances.

34. The position detecting method according to claim 33, wherein the position detecting system includes a plurality of the responders, the position detecting method further comprising the steps of:

identifying each of the responders, based on the response signal; and transmitting distance information to each of the interrogators, the distance information indicating each of the detected distances.

35. A non-transitory computer-readable medium recording a program to be performed by a computer in a position detecting system that includes a plurality of interrogators each transmitting a pulse signal as an interrogating wave, and a responder that receives the pulse signal and returns a response signal based on the received pulse signal, the program comprising:

detecting the distance between each two of the interrogators after receiving the pulse signal transmitted by each of the interrogators;

detecting the distance between each of the interrogators and the responder, based on the pulse signal and the response signal; and detecting the position of each of the interrogators and the responder in the position detecting system, based on each of the detected distances.

* * * * *